US012687457B2

(12) United States Patent
Magri et al.

(10) Patent No.: US 12,687,457 B2
(45) Date of Patent: Jul. 21, 2026

(54) METHOD AND APPARATUS FOR PERFORMING OPTICAL TIME DOMAIN REFLECTOMETRY ON AN OPTICAL FIBRE

(71) Applicant: Telefonaktiebolaget LM Ericsson (publ), Stockholm (SE)

(72) Inventors: Roberto Magri, Genoa (IT); Davide Sanguinetti, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 116 days.

(21) Appl. No.: 18/687,893

(22) PCT Filed: Sep. 2, 2022

(86) PCT No.: PCT/EP2022/074534
§ 371 (c)(1),
(2) Date: Feb. 29, 2024

(87) PCT Pub. No.: WO2023/031439
PCT Pub. Date: Mar. 9, 2023

(65) Prior Publication Data
US 2024/0369446 A1     Nov. 7, 2024

(51) Int. Cl.
*G01M 11/00*     (2006.01)
*H04B 10/071*     (2013.01)

(52) U.S. Cl.
CPC .... *G01M 11/3118* (2013.01); *G01M 11/3154* (2013.01); *H04B 10/071* (2013.01)

(58) Field of Classification Search
CPC .......... G01M 11/3118; G01M 11/3154; G01M 11/3127; G01M 5/0041; G01M 5/005;
(Continued)

(56) References Cited

U.S. PATENT DOCUMENTS 4,289,398 A     9/1981   Robichaud
5,488,662 A     1/1996   Fox et al.
(Continued)

FOREIGN PATENT DOCUMENTS

CN     103499358 A     1/2014
CN     107408982 A  *  11/2017   ......... H04B 10/0775
(Continued)

OTHER PUBLICATIONS

Azendorf, Florian, et al., "Group Delay Measurements of Multicore Fibers with Correlation Optical Time Domain Reflectometry", 2020 22nd International Conference on Transparent Optical Networks (ICTON), Bali, Italy, 2020, 4 pages.
(Continued)

*Primary Examiner* — Mohamed K Amara
(74) *Attorney, Agent, or Firm* — Murphy, Bilak & Homiller, PLLC

(57)     ABSTRACT
The present application relates to a method for performing optical time domain reflectometry (OTDR) on an optical fibre. The method comprises transmitting a first signal into an optical fibre, wherein the first signal comprises a sequence of optical radiation pulses based on a coded sequence, wherein each of the sequence of optical radiation pulses are separated by a fill pattern controlled by a binary sequence of high and low values.

13 Claims, 20 Drawing Sheets

(58) Field of Classification Search
CPC ............. G01M 5/0058; G01M 5/0008; G01M
5/0016; G01M 5/0025; G01M 5/0033;
G01M 11/00; G01M 11/005; G01M
11/02; G01M 11/0214; G01M 11/0207;
G01M 11/0292; G01M 11/0285; H04B
10/071
See application file for complete search history.

(56) References Cited

U.S. PATENT DOCUMENTS

| | | | | |
|---|---|---|---|---|
| 5,570,217 | A | * | 10/1996 | Fleuren ................ H04B 10/071 |
| | | | | 356/73.1 |
| 10,135,531 | B1 | | 11/2018 | Joffe et al. |
| 10,727,937 | B1 | | 7/2020 | Salehiomran et al. |
| 2003/0234922 | A1 | | 12/2003 | Asahina et al. |
| 2009/0027656 | A1 | * | 1/2009 | Zhang ................ G01M 11/3118 |
| | | | | 356/73 |
| 2014/0078506 | A1 | * | 3/2014 | Hu ..................... G01M 11/3118 |
| | | | | 356/445 |
| 2018/0259422 | A1 | * | 9/2018 | Castro ................ G01M 11/3127 |
| 2019/0379451 | A1 | * | 12/2019 | Eiselt ................... H04L 7/0075 |
| 2021/0242936 | A1 | | 8/2021 | Eiselt et al. |
| 2021/0404909 | A1 | | 12/2021 | Leclerc et al. |
| 2022/0128434 | A1 | | 4/2022 | Perron et al. |
| 2025/0146904 | A1 | * | 5/2025 | Leclerc ............... G01M 11/338 |

FOREIGN PATENT DOCUMENTS

| | | | | |
|---|---|---|---|---|
| EP | 3414542 | B1 | 7/2020 | |
| JP | 5652889 | B2 * | 1/2015 | ........ G01M 11/3118 |
| WO | 9517053 | A1 | 6/1995 | |
| WO | 2022053133 | A1 | 3/2022 | |

OTHER PUBLICATIONS

Azendorf, Florian, et al., "Latency Measurement of 100 km Fiber Using Correlation-OTDR", arXiv.org, arXiv:2011.1257v1, Nov. 25, 2020.

Datta, Amitabha, et al., "Performance Enhancement of Raman Optical Time Domain Reflectometer Using Golay Codes", Photonics 2010: Tenth International Conference on Fiber Optics and Photonics, Spie, 1000 20th St. Bellingham WA 98225-6705 USA, vol. 8173, No. 1, Dec. 29, 2010, 8 pages.

* cited by examiner

500

510

Window in
cage top

520

1000

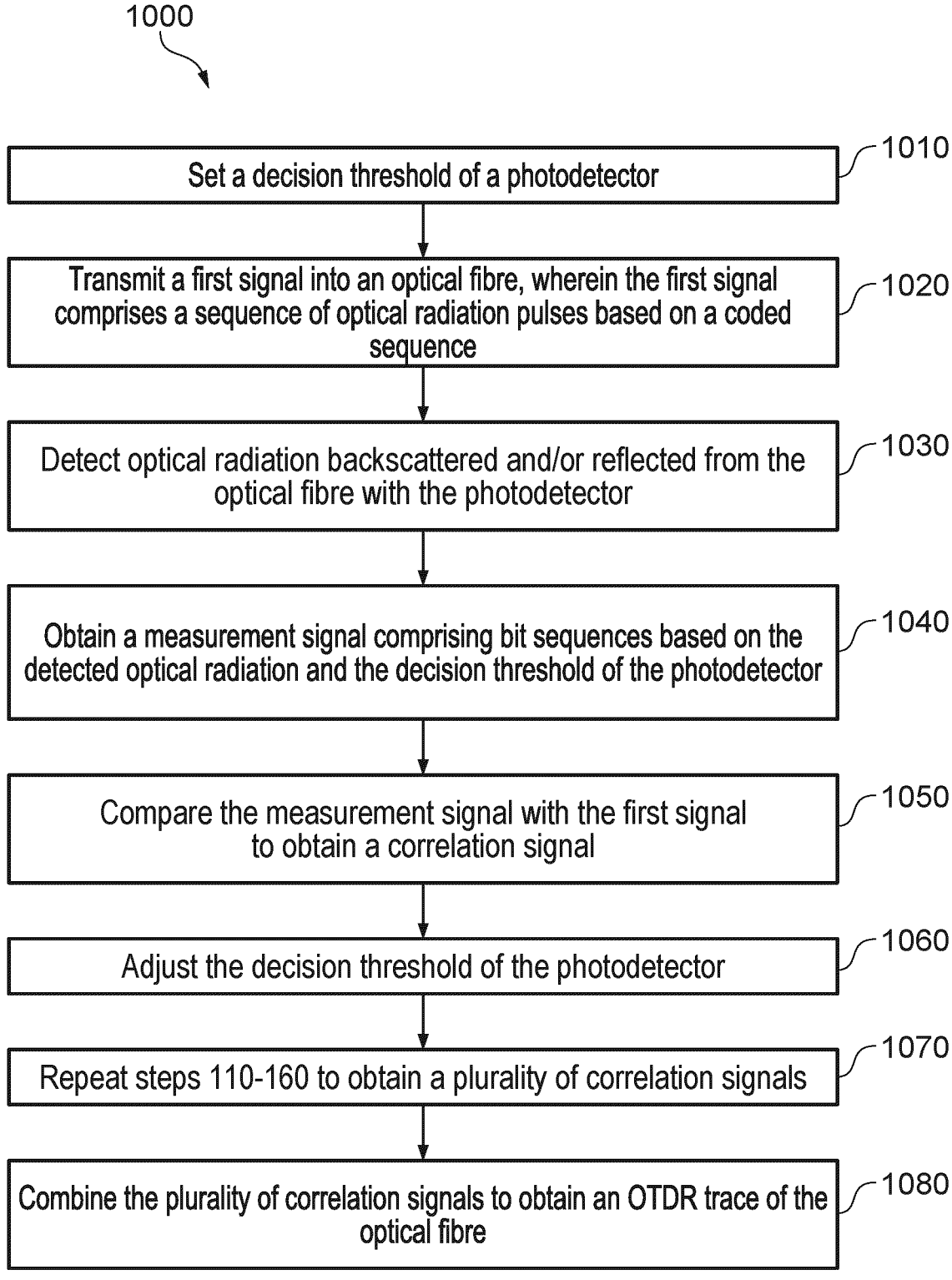

| | |
|---|---|
| Set a decision threshold of a photodetector | 1010 |
| Transmit a first signal into an optical fibre, wherein the first signal comprises a sequence of optical radiation pulses based on a coded sequence | 1020 |
| Detect optical radiation backscattered and/or reflected from the optical fibre with the photodetector | 1030 |
| Obtain a measurement signal comprising bit sequences based on the detected optical radiation and the decision threshold of the photodetector | 1040 |
| Compare the measurement signal with the first signal to obtain a correlation signal | 1050 |
| Adjust the decision threshold of the photodetector | 1060 |
| Repeat steps 110-160 to obtain a plurality of correlation signals | 1070 |
| Combine the plurality of correlation signals to obtain an OTDR trace of the optical fibre | 1080 |

Fig. 10

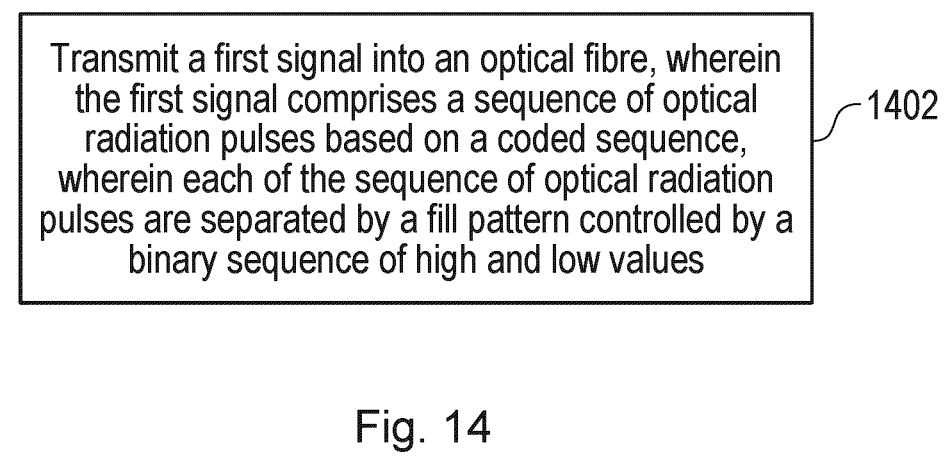

Transmit a first signal into an optical fibre, wherein the first signal comprises a sequence of optical radiation pulses based on a coded sequence, wherein each of the sequence of optical radiation pulses are separated by a fill pattern controlled by a binary sequence of high and low values ⟋1402

Fig. 14

METHOD AND APPARATUS FOR PERFORMING OPTICAL TIME DOMAIN REFLECTOMETRY ON AN OPTICAL FIBRE

TECHNICAL FIELD

The present application relates to a method, apparatus and computer program product for performing optical time domain reflectometry (OTDR) on an optical fibre. The present application also relates to an optical plug for providing a connection between a transceiver and an optical fibre. The present application further relates to a transceiver.

BACKGROUND

OTDR is a technique that may be used to characterise an optical fibre. OTDR can locate imperfections along an optical fibre by measuring the round-trip travel time of an optical radiation pulse reflected and/or backscattered from sites along the fibre. The optical pulse may be backscattered from scattering sites which result due to imperfections in the optical fibre. The optical pulse may also be reflected from points along the fibre, which may result from, for example, an optical fibre splice.

Traditional OTDR presented a trade-off between resolution and dynamic range by adjusting the duration of the optical pulse transmitted into an optical fibre. This problem has been solved by correlation-OTDR where long coded sequences of narrow pulses replace single high power and wide pulses. Time resolution of below 1 ns has been demonstrated by correlation OTDR. Due to this time performance, correlation OTDR has been proposed to precisely measure the one-way fibre latency characteristics of optical fibres and support fibre latency asymmetry calibration, which are both required for optical fibres for 5G RAN applications where nanosecond accuracy is desired.

A paper entitled "Latency Measurement of 100 km Fiber Using Correlation-OTDR" by Azendorf et al, 20th ITG-Symposium Photonic Networks 2019 discloses a correlation OTDR technique operating without an analogue-to-digital converter (ADC) at 2.5 Gb/s to achieve a sub-ns resolution. A terminal reflector is used at the end of the fibre in order to guarantee that a sufficiently strong reflection can be detected as a demarcation point.

Whilst the correlation OTDR technique described above can achieve sub-ns resolution, it suffers from a number of drawbacks. The technique employs a terminal reflector as the demarcation element. The use of the terminal reflector complicates system installation, deployment and maintenance, which increases operating expenses. The technique also does not provide any OTDR fibre characterisation, for example detailing the locations of reflections and scattering sites within the fibre. The absence of the ADC in conventional correlation-OTDR techniques, makes it currently impossible to detect any reflections other than the one generated by the demarcation reflector.

The technique further does not provide a means to implement the solution in a transceiver, which is also used for data traffic. The circulator in the correlation OTDR setup will hinder the normal operation of such a transceiver. Thus, the fibre under test will need to be disconnected from the transceiver used for data traffic, which further increases operating expenses and makes performing OTDR cumbersome and labour intensive. The technique also requires 0 bit stuffing making it difficult to use with standard small formfactor pluggable (SFP) transceivers, which will enter squelching mode if no input is present.

SUMMARY

It is an aim of the present disclosure to provide a method, an apparatus, a computer program product and an optical plug that which at least partially address one or more of the challenges discussed above.

According to a first aspect there is provided a method for performing optical time domain reflectometry, OTDR, on an optical fibre. The method comprises transmitting a first signal into an optical fibre, wherein the first signal comprises a sequence of optical radiation pulses based on a coded sequence, wherein each of the sequence of optical radiation pulses are separated by a fill pattern controlled by a binary sequence of high and low values.

According to a second aspect there is provided an apparatus for performing optical time domain reflectometry, OTDR, on an optical fibre. The apparatus comprises processing circuitry configured to: transmit a first signal into an optical fibre, wherein the first signal comprises a sequence of optical radiation pulses based on a coded sequence, wherein each of the sequence of optical radiation pulses are separated by a fill pattern controlled by a binary sequence of high and low values.

BRIEF DESCRIPTION OF THE DRAWINGS

For a better understanding of the present disclosure, and to show more clearly how it may be carried into effect, reference will now be made, by way of example, to the following drawings in which:

FIG. 10 is a flowchart illustrating process steps in a method for performing OTDR on an optical fibre;

FIG. 14 illustrates a method for performing optical time domain reflectometry, OTDR, on an optical fibre;

DETAILED DESCRIPTION

Figure 1:
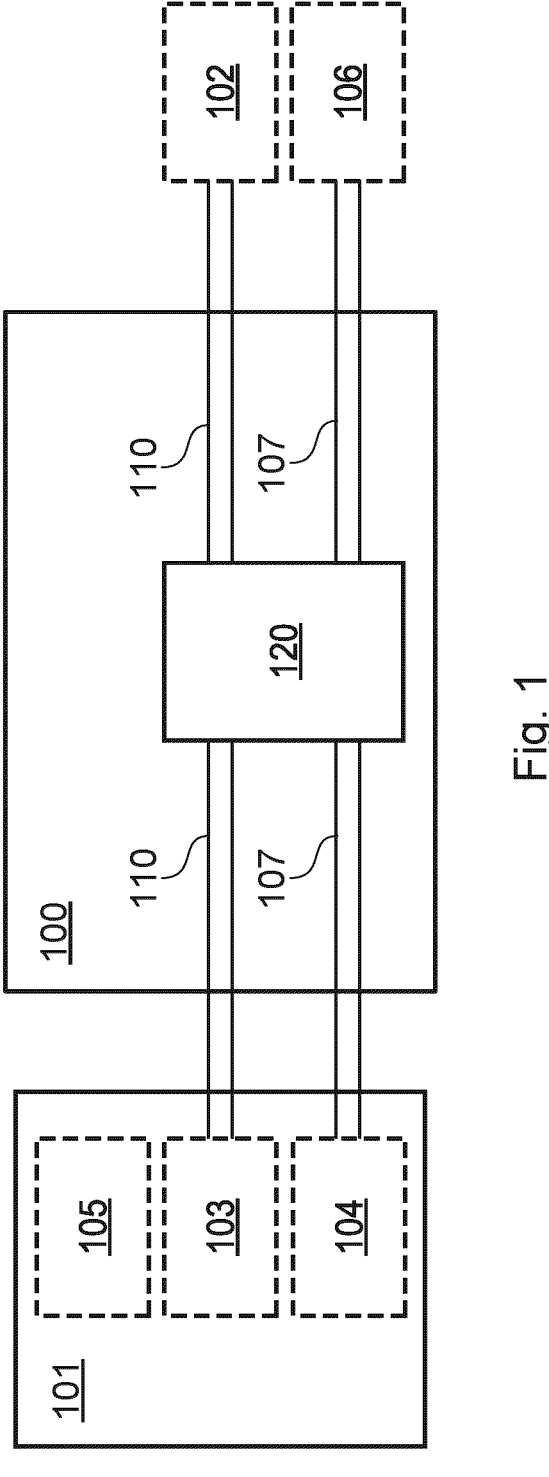
FIG. 1 is a block diagram illustrating functional modules in an example optical plug.

The present disclosure relates to methods and apparatus for performing (OTDR) on an optical fibre. The methods and apparatuses described herein may achieve sub-ns resolution without the use of an ADC. In particular, the methods and apparatus according to the present disclosure may use a correlation OTDR technique that can characterise the optical fibre to obtain information of scattering sites and reflection locations along the optical fibre without the use of an ADC, as well as providing the sub-ns resolution. To achieve this, examples described herein exploit a variable decision threshold of a transceiver, (for example, such as specified in the SFF-8472 standard). As will be described in more detail below, detected light backscattered or reflected from within the optical fiber will be output as a bit sequence from the transceiver, due to the variable decision threshold. This sequence may be correlated with the sequence of pulses transmitted into the optical fibre in the correlation OTDR technique, to identify backscattered or reflected light. The variable threshold may be adjusted and the OTDR process repeated a number of times to obtain a number of OTDR traces. These traces may then be combined (for example, averaged) to obtain an OTDR trace of the optical fibre, which identifies locations of scattering and reflection sites along the optical fibre, as well as a reflection at the end of the optical fibre without the use of a terminal reflector.

Examples according to the present disclosure can also achieve the sub-ns resolution and obtain an OTDR trace that characterises an optical fibre, with an OTDR arrangement that allows the optical fibre to be characterised remotely. In other words, no manual intervention is required to plug in a different component in order to perform the OTDR. Examples according to the present disclosure make use of a transceiver and an optical plug that allow the arrangement to switch between operating in a data transmission mode and in an OTDR mode. The transceiver comprises a thermoelectric temperature adjustment module, which can adjust the temperature and thus the wavelength of the optical source of the transceiver. In the data transmission mode, the thermoelectric temperature adjustment module may not be active and thus may not adjust the wavelength of the optical source of the transceiver. However, in the OTDR mode, the thermoelectric temperature adjustment module may thus be operated to adjust the wavelength of the optical source. The optical plug may also comprise an optical filter arrangement, which dependent on the wavelength of the optical source, can direct light reflected and/or backscattered from within the optical fibre to the photodetector of the transceiver for further processing.

Therefore, in OTDR mode, the wavelength of the optical source may be selected in order to cause the reflected and/or backscattered light from within the optical fibre to be directed to the photodetector. However, in the data transmission mode, the wavelength of the optical source is such that the optical filter arrangement passes radiation reflected and/or backscattered from within the optical fibre, such that it is not directed to the photodetector and therefore does not interfere with data traffic signals received at the photodetector of the transceiver.

FIG. 1 is a block diagram illustrating functional modules in an optical plug 100 for providing a connection between a transceiver 101, a first optical fibre 102 and a second optical fibre 106, where the transceiver 101 comprises an optical source 103 and a photodetector 104. In some examples, the optical source may comprise a laser diode. In some examples, the transceiver 101 and the optical fibre 102 may be configured for data transmission. For example, the transceiver may comprise a Small Formfactor Pluggable (SFP) transceiver. The optical source 103 may be configured to output optical source radiation at a first wavelength or a second wavelength.

In some examples, a thermoelectric temperature adjustment module 105, such as a Peltier device, may be configured to adjust the wavelength from the first wavelength to the second wavelength. It will be appreciated that the thermoelectric temperature adjustment module 105 may, as it causes the temperature to decrease or increase, may cause the wavelength to change from the first wavelength to the second wavelength.

The optical plug 100 comprises a transmission path 110 for channeling optical source radiation from the optical source 103 into the first optical fibre 102. The optical plug 100 further comprises a reception path 107 for channeling optical radiation from the second optical fibre 106 to the photodetector 104.

The optical plug 100 further comprises an optical filter arrangement 120 configured to pass the optical source radiation from the optical source 103 into the first optical fibre 102. Responsive to the optical source radiation being the first wavelength, the optical filter arrangement 120 is further configured to pass optical source radiation backscattered and/or reflected from within the first optical fibre 102 along the transmission path 110 and, responsive to the optical source radiation being the second wavelength, the optical filter arrangement 120 is further configured to direct optical source radiation backscattered and/or reflected from the first optical fibre 102 to the reception path 107 and to the photodetector 104.

Figure 2:
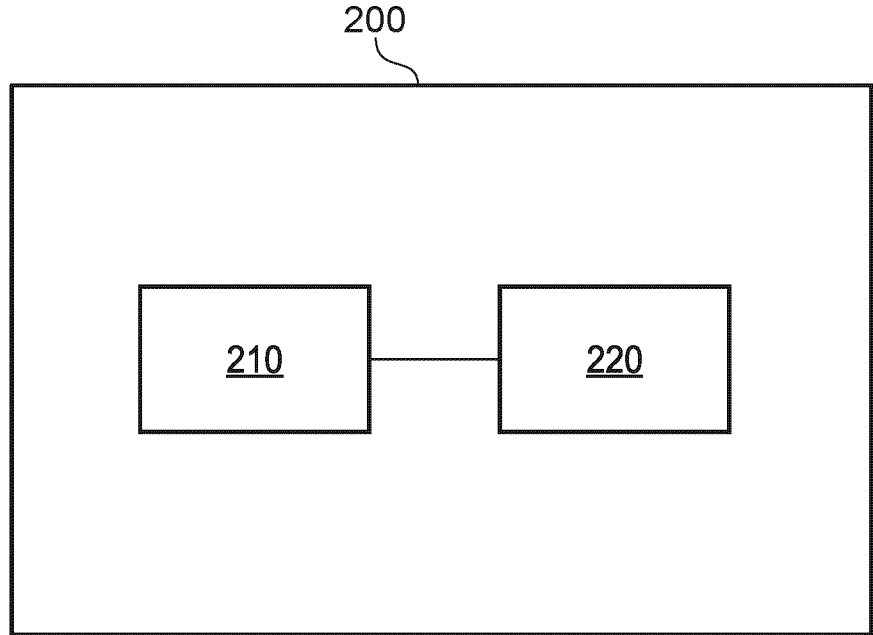
FIG. 2 is a block diagram illustrating functional modules in a transceiver.

FIG. 2 is a block diagram illustrating functional modules in a transceiver 200. The transceiver 200 comprises an optical source 210 for outputting optical source radiation. In some examples, the optical source may comprise a laser diode.

Transceiver 200 further comprises a thermoelectric temperature adjustment module 120 configured to adjust a temperature of the optical source to adjust the wavelength of the optical source radiation from the first wavelength to the second wavelength. In some examples, the thermoelectric temperature adjustment module may comprise a Peltier device.

Figure 3:
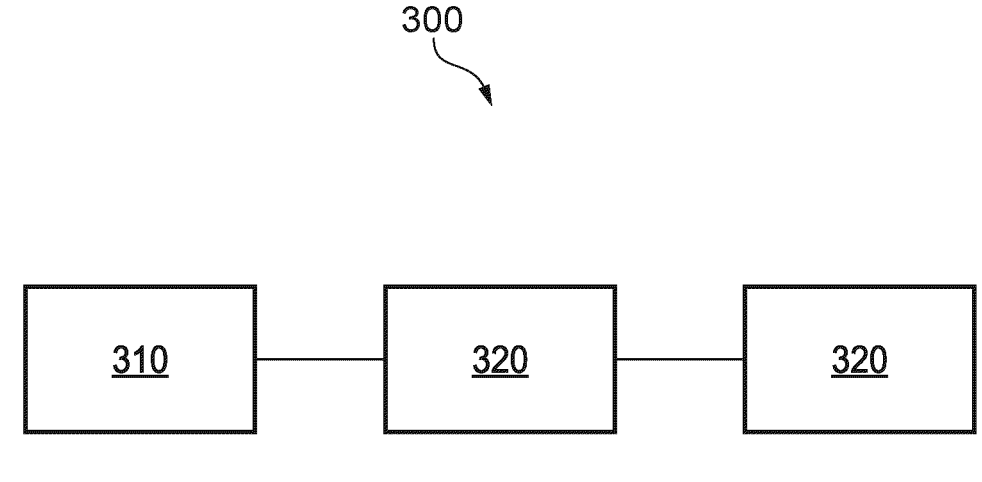
FIG. 3 is a block diagram illustrating functional modules in a fibre optic system.

FIG. 3 is a block diagram illustrating functional modules in a fibre optic system 300. In some examples, the fibre optic system 300 may comprise part of an optical fibre network.

The system 300 comprises at least one optical fibre 310. The system 300 further comprises a transceiver 320. In some examples, the transceiver 320 may comprise the transceiver 200 described above with respect to FIG. 2.

The system 300 further comprises an optical plug 330 connecting the transceiver 320 and the at least one optical fibre 310. In some examples, the optical plug 330 may comprise the optical plug 100 described above with respect to FIG. 1.

Figure 4A:
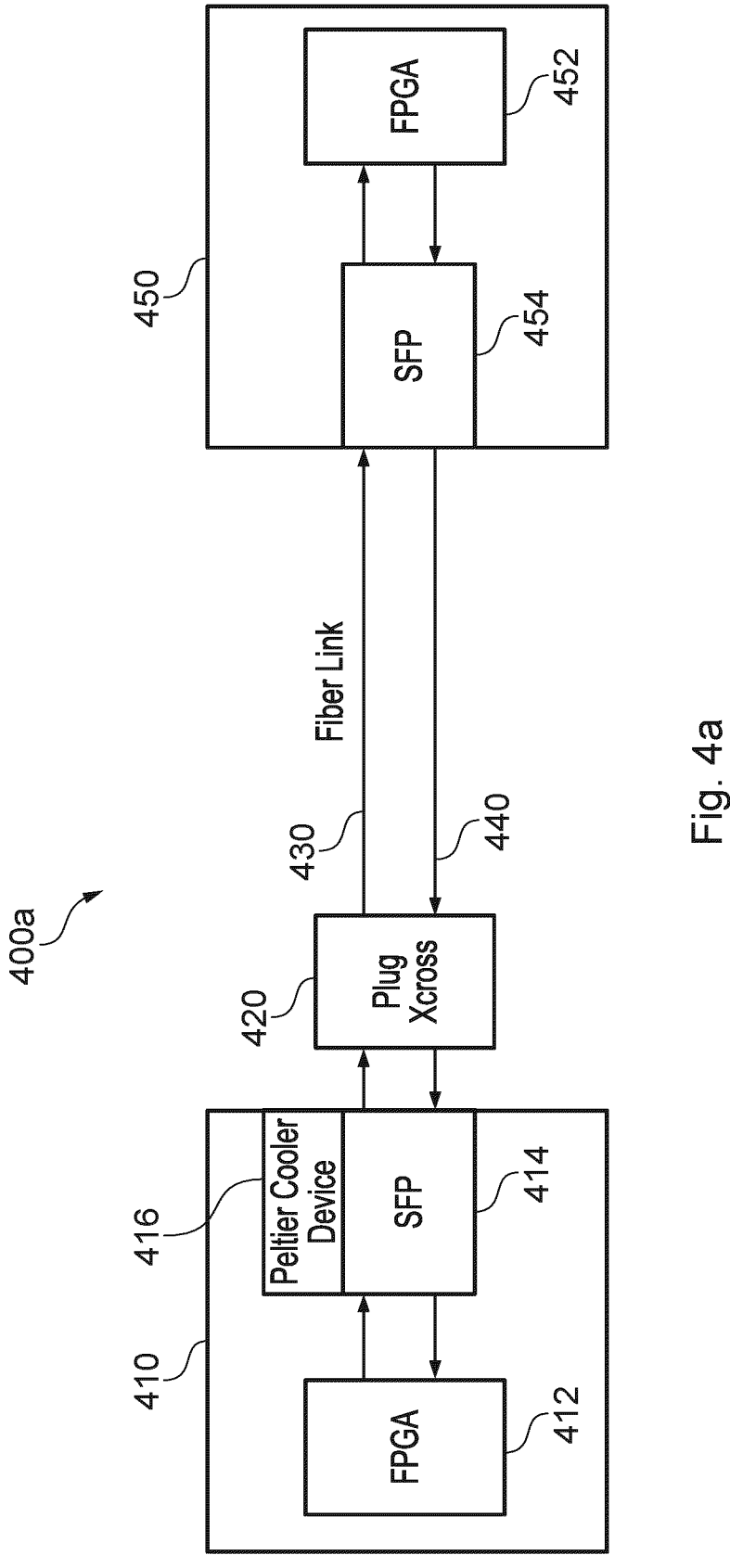
FIGS. 4a and 4b are schematic examples of an optical fibre system.

FIG. 4a illustrates an example of an optical fibre system 400a. In some examples, optical fibre system 400a may comprise part of an optical fibre network (for example a fronthaul network in a radio access network). FIG. 400a illustrates the architecture of the optical fibre system 400a, which may be operable in a data transmission mode to communicate data signals, transmitted over optical radiation carrier waves, between a first optical network unit 410 and a second optical network unit 450. As will be described in more detail below, with reference to FIG. 4b, optical fibre system 400a may further be operable in an OTDR mode.

The first optical network unit 410 comprises a first transceiver 414 that, in the illustrated example of FIG. 4a, comprises a first transceiver 414. In this example, the first transceiver 414 comprises a SFP transceiver 414 (for example, grey 1310 nm SFP transceiver). The first transceiver 414 may comprise a first optical source and a first photodetector. The first optical network unit 410 further comprises a processor 412, which in the illustrated example, comprises a field programmable gate array (FPGA). The processor 412 may thus, when the system is operable in a data transmission mode, be configured to control the data signal output by the first optical source of the first transceiver 414 and process the data signal detected by the first photodetector of first transceiver 414.

The system 400a further comprises first optical fibre 430, which is configured to carry data signals from the first optical network unit 410 to the second optical network unit 450. System 400a further comprises second optical fibre 440, which is configured to carry data signals from the second optical network unit 450 to the first optical network unit 410.

The second optical network unit 450 comprises a second transceiver 454 and second processor 452, which in the illustrated example of FIG. 4a comprise an SFP transceiver and FPGA, respectively. The second processor 452 may thus be configured to control the optical source of second transceiver 454 to transmit data signals along the second optical fibre 440 towards the first optical network unit 410. The second processor 454 may, in some example, be further configured to process data signal detected at the photodetector of second transceiver 454, received from the first optical fibre 430.

The optical system 400a further comprises an optical plug 420 connecting the first transceiver 414 and the first and second optical fibres 430, 440. As will be described in more detail below, optical plug 420 comprises an optical filter arrangement which, when the optical system 400a is operated in a data transmission mode, passes optical radiation from the first transceiver to the first optical fibre 430 (or waveguide) and passes optical radiation from the second optical fibre 440 (or waveguide) to the first transceiver 414. In the data transmission mode, the optical filter arrangement further passes radiation reflected and/or backscattered from within the first optical fibre 430.

As illustrated in FIG. 4a, the first optical network unit 410 comprises a thermoelectric temperature adjustment module 416, which may be coupled to the optical source of the first transceiver 414. The thermoelectric temperature adjust module 416 may comprise a Peltier device.

Figure 5:
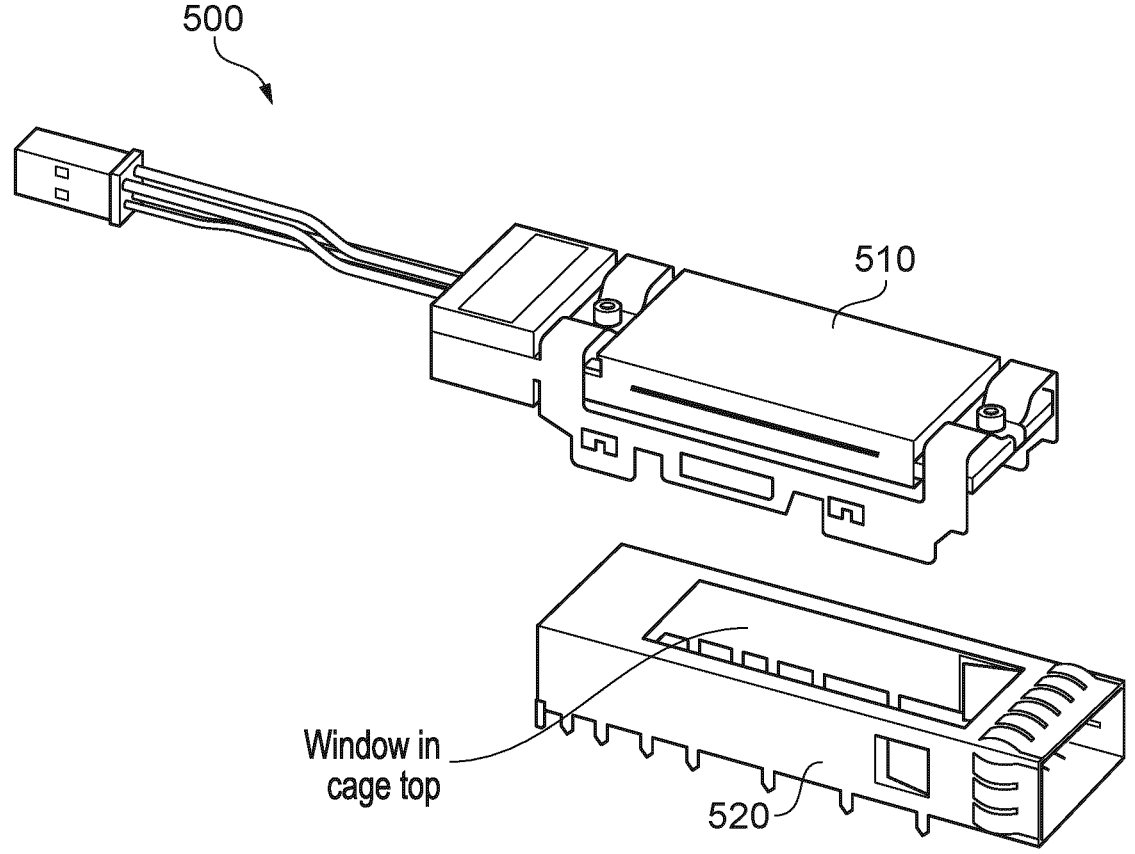
FIG. 5 is an example of a thermoelectric temperature adjustment module.

FIG. 5 illustrates one example 500 of a Peltier device 510 and an SFP cage 520. In some examples, the SFP cage 520 may also be referred to as an SFP socket. The SFP cage 520 is configured to receive an SFP transceiver (not illustrated). SFP cage 520 comprises a window or aperture, which may, in use, allow the Peltier device 510 to contact the SFP transceiver housed in the SFP cage 520. In this way, the Peltier device 520 may impart a temperature change (cooling) to the optical source of the SFP transceiver to shift the wavelength of the optical source from the first wavelength to the second wavelength. In another example, SFP cage 520 may not comprise the window or aperture and may instead comprise a thermally conductive material configured to, in use, transfer the temperature change from the Peltier device 510 to the optical source of the SFP transceiver.

The thermoelectric temperature adjust module 416 may be configured to adjust a temperature of the optical source of the first transceiver 414 to adjust the wavelength of the optical source radiation, output from the optical source. For example, the thermoelectric temperature adjust module 416 may be configured to switch the temperature of the optical source of the first transceiver from a first temperature at which the wavelength of the optical source radiation is a first value, and a second temperature at which the wavelength of the optical source radiation is a second value. As one skilled in the art will be familiar with, the application of a current to a thermoelectric temperature adjust module 416, such as a Peltier device, may cause the temperature of the device to decrease. By coupling the thermoelectric temperature adjust module 416 to the optical source of the first transceiver 414, this temperature change may be sufficient to adjust the wavelength of the optical radiation, output from the optical source, from a first value to a second value, as one skilled in the art will readily understand.

As described above, the optical system 400a is operable in a data transmission mode in which data signals are transmitted between the first optical network unit 410 and the second optical network unit 450. In this mode of operation, the temperature adjustment module may not be supplied with a current, or may be supplied with a current configured to hold the temperature of the optical source within a first range, such that the optical source of the first transceiver 414 may output optical radiation with a wavelength of a first value. The first value may be within a range of values such that the optical filter arrangement operates in the data transmission mode. The optical source of second transceiver 454 may also output optical radiation with a wavelength of the first value. With this configuration, the optical filter arrangement of the optical source will thus pass the optical radiation signal such that data signals are transmitted between first and second optical network units 410, 450.

Figure 4B:
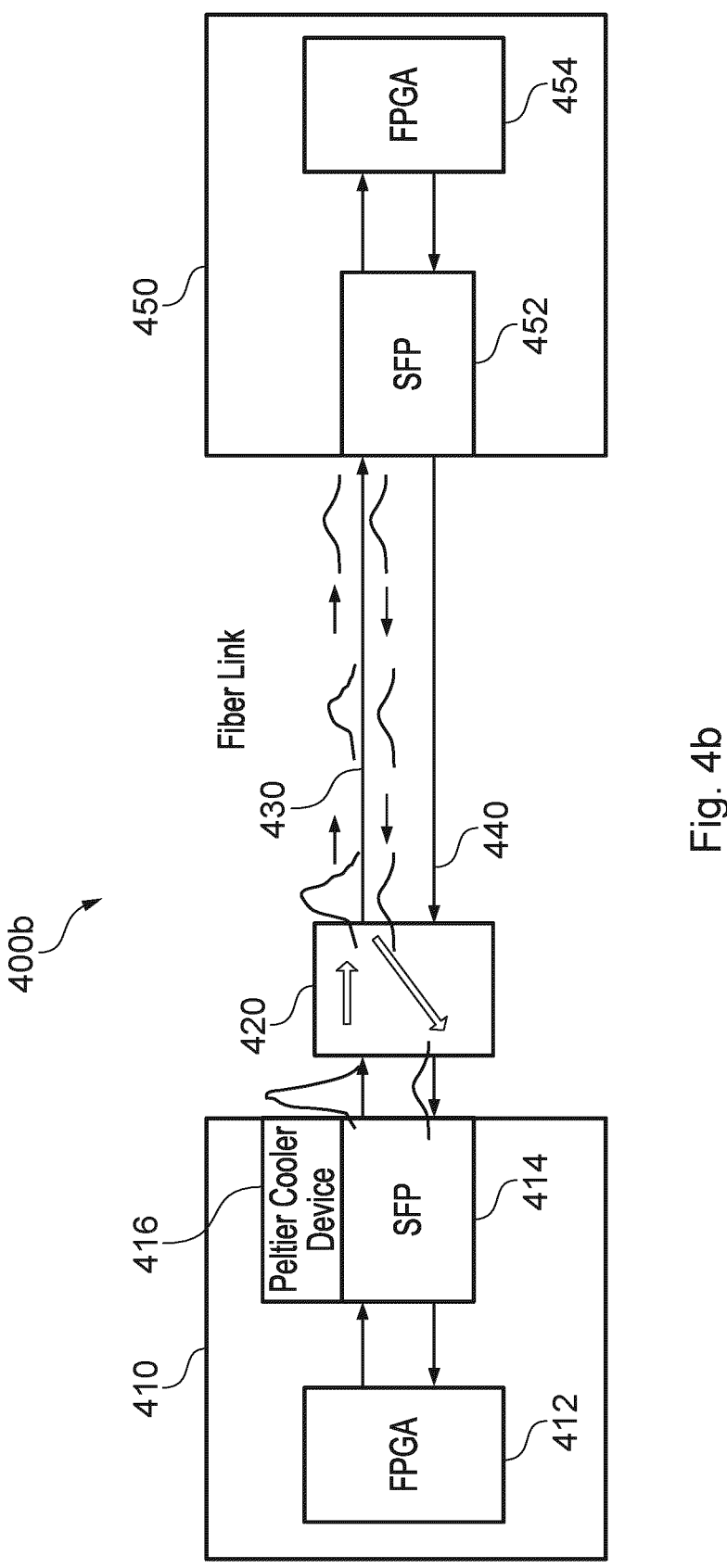

FIG. 4b illustrates optical network system 400b, which comprises corresponding elements to system 400a which are identified with corresponding reference numerals. FIG. 4b illustrates the operation of system 400b in an OTDR mode to perform OTDR on first optical fibre 430.

To operate the system 400b in the OTDR mode, a current may be applied to thermoelectric temperature adjustment module 416 to adjust (e.g. decrease) the temperature of the optical source of first transceiver 414. In particular, the temperature of the optical source of the first transceiver 414 may be adjusted such that the wavelength of the optical radiation output by the optical source changes from the first value to the second value. The second value may fall within a range of wavelengths for which the optical filter arrangement acts to direct reflected and/or backscattered light from the first optical fibre 430 to the photodetector of the first transceiver 414. In some examples, the temperature change may be about of 50 K. In some examples, the difference between the first value of the wavelength and the second value of the wavelength may be about 5 nm. For example, the first value may be about 1310 nm and second value of wavelength may be about 1315 nm. Thus, in some examples, the optical source may comprise a temperature dependence to wavelength of about 0.1 nm per K.

As will be described in more detail below, the optical source radiation output at the wavelength of the second value may be passed by the optical filter arrangement of optical plug 420 and transmitted into first optical fibre 430. Therefore, the optical radiation transmitted by the transceiver 414 into the first optical fibre 430 may be backscattered and/or reflected from sites within the first optical fibre 430 and received back at the optical filter arrangement of the optical plug 420.

As will be described in more detail below, the optical filter arrangement of the optical plug 420 may be configured to direct optical radiation comprising the wavelength of the second value backscattered and or reflected from the first optical fibre 430 towards the photodetector of the first transceiver 414. As will be described in more detail below, first processor may further be configured to analyse the detected backscattered and/or reflected signals, such that an OTDR trace of the first optical fibre 430 may be obtained.

In this way, OTDR may be performed on an optical fibre deployed in an optical fibre network, which can be performed remotely without the need of adjusting the configuration of the optical fibre, for example, by disconnecting the optical fibre from an optical network unit and connecting the optical fibre to dedicated OTDR hardware.

In the OTDR mode, the second transceiver 452 of second optical network unit 452 may be suspended from transmitting data signals on second optical fibre 440. For example, by shutting down second transceiver 452. Such data signals may interfere with the optical radiation of the second wavelength backscattered and/or reflected from within the first optical fibre 430 at the photodetector of the first transceiver 414.

As illustrated in FIGS. 4a and 4b, an optical plug 420 according to examples of the present disclosure may be provided to connect the first transceiver 414, of first optical network unit 410, to first optical fibre 430 and second optical fibre 440. However, an optical plug may not be provided to connect the first and second optical fibres to the second transceiver 452 of the second optical network unit 450, or the optical plug used to connect the first and second optical fibres to the second transceiver may not comprise an optical filter arrangement as described for the optical plug 420.

In some examples, the optical plug 420 may only allow the optical fibre used for transmission with respect to a transceiver to be characterised by OTDR and not the optical fibre used for reception of data signals. In the illustrated examples of FIGS. 4a and 4b, the first optical fibre 430 is the optical fibre used for data signal transmission with respect to the first transceiver 414 and may be subject to OTDR, whereas the second optical fibre 440 is used for receiving data signals with respect to the first transceiver and thus may not be subject to OTDR. However, in some examples, the first and second optical fibres 430, 440 may be deployed to run along substantially the same path, for example they be housed within the same fibre cable casing. Thus, from the OTDR trace of the first optical fibre 430, information of the second optical fibre 440 may also be inferred.

Figure 6:
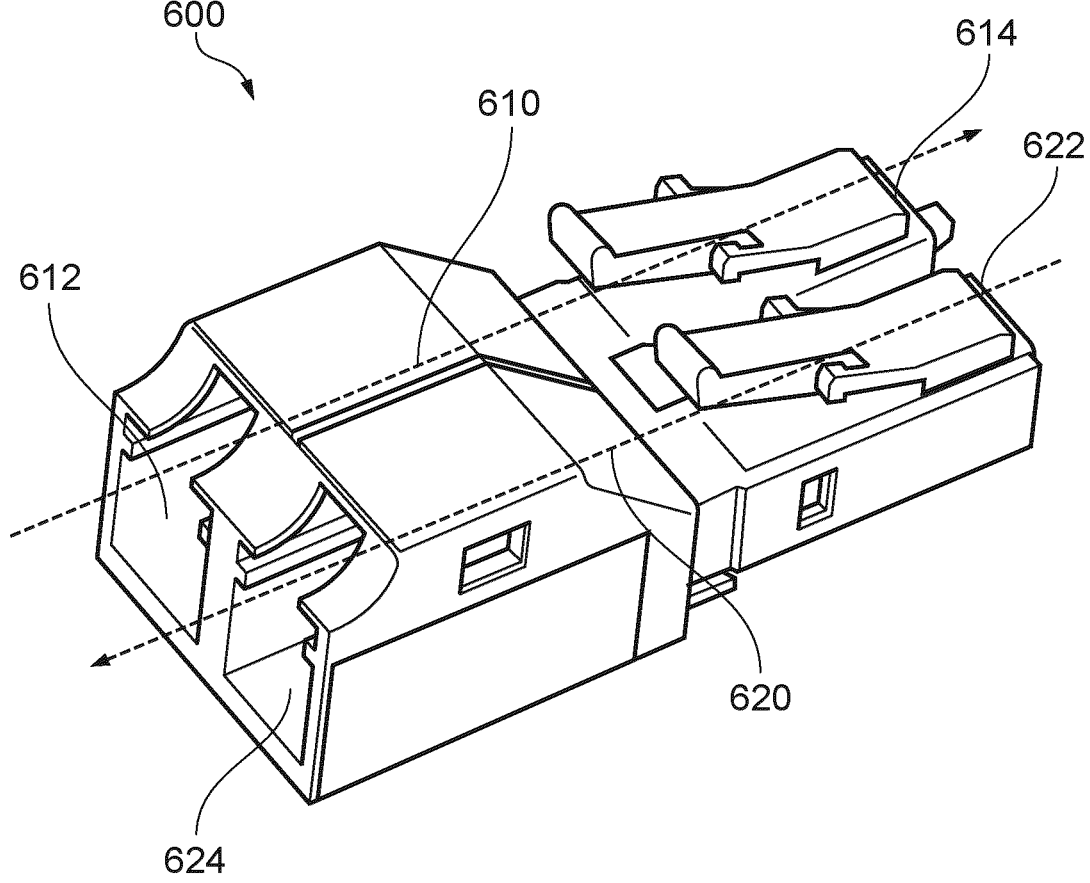
FIG. 6 is an example of an optical plug.

FIG. 6 illustrates an example of an optical plug 600 for providing a connection between a transceiver and a first optical fibre for transmitting data signals. The optical plug may also provide a suitable connection between the transceiver and a second optical fibre for receiving data signals. For example, optical plug 600 may comprise optical plug 420 described above with reference to FIGS. 4a and 4b.

The optical plug 600 comprises a transmission path 610 for channeling optical source radiation from an optical source of the transceiver into a first optical fibre. The first optical fibre may thus be used for transmitting data signals, for example, as described above with reference to FIGS. 4a and 4b. The transmission path may thus comprise a first end 612 for receiving optical source radiation from the optical source and a second end 614 for outputting optical source radiation to the first optical fibre.

The optical plug 600 further comprises a reception path 620 for channeling optical radiation from a second optical fibre to the photodetector of the transceiver. The reception path thus comprises a first end 622 for receiving optical radiation from the second optical fibre and a second end 624 for outputting optical radiation to the photodetector of the transceiver.

The internal structure of the optical plug 600 may thus comprise a free space optical bench, which, as will be described in more detail below, comprises an optical filter arrangement.

In some examples, the first end 612 of the transmission path 610 and the second end 624 of the reception path 620 may be configured to interface with and provide a mating connection to the transceiver, such that the first end 612 of the transmission path 610 is aligned with the optical source and the second end 624 of the reception path 620 is aligned with the photodetector. In some examples, the second end 614 of the transmission path 610 may interface with, and provide a mating connection with, the first optical fibre; and the first end 622 of the reception path 620 may interface with and provide a mating connection with the second optical fibre.

Figure 7A:
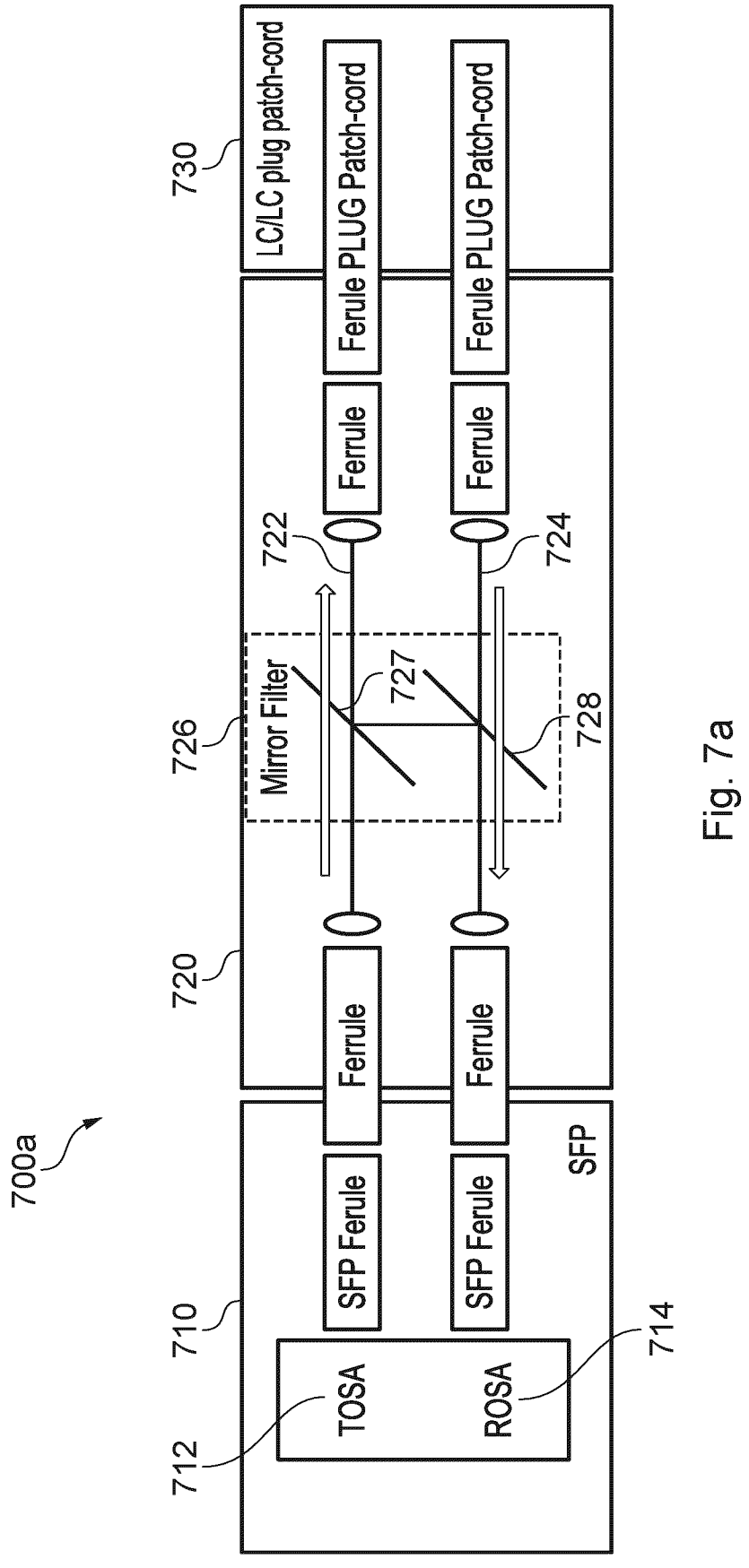
FIGS. 7a and 7b are schematic examples of an optical plug.

FIG. 7a illustrates the principle of operation of an optical plug 720 in an optical system 700a in a data transmission mode. Optical system 700a illustrates an optical plug 720 interfaced between a transceiver 710 and a patch cord 730. The patch cord 730 provides a connection to a first and second optical fibre. Optical system 700a may thus illustrate a portion of optical systems 400a and 400b. Optical system 700a may thus be operable to provide at least some of the functionality described above with reference to FIGS. 4a and 4b. Optical plug 720 may also comprise all of the functionality described above with reference to FIG. 6. Optical plug 720 thus comprises a transmission path 722 and reception path 724.

As described above with reference to FIG. 6, the optical plug 720 may interface with the transceiver 710 such that the optical source 712 is aligned with the transmission path 722. Optical radiation may then be channeled through the transmission path 722 to a first optical fibre connected to patch cord 730. In this way, the transmission path 722 may thus be used to channel data signals from the transceiver to the first optical fibre. In a similar manner, the optical plug 720 may interface with the transceiver 710 such that the photodetector 714 is aligned with the reception path 724. Optical radiation may then be channeled through the reception path 724 to the photodetector 714 from a second optical fibre connected to patch cord 730. In this way, the reception path 724 may thus be used to channel data signals from the second optical fibre to the transceiver 710.

As illustrated in FIG. 7a and as described above with reference to FIGS. 4a and 4b, optical plug 720 further comprises an optical filter arrangement 726. The optical filter arrangement 726 comprises a first mirror filter 727 in the transmission path 722 and a second mirror filter 728 in the reception path 724. In some examples, the mirror filters 727,728 may be optical filters fabricated using thin film technology (i.e. a thin film filter, TFF). The filter is configured to pass or reflect the optical signal, dependent on the wavelength and/or the direction of travel of the wavelength.

When system 700a is operated in the data transmission mode and the optical radiation output from the optical source 712 is output with a wavelength of the first value, the first mirror filter 727 is configured to pass the optical source radiation from the optical source into the first optical fibre. In a similar manner, the second mirror filter 728 is configured to pass optical radiation comprising a wavelength of the first value from the second optical fibre to the photodetector 714. As such, the mirror filters 726,728 do not reflect or deviate the optical signals. In this configuration, there is no optical signal reflected between the transmission path 722 and reception page 724.

As described above, FIG. 7*a* illustrates an example of an optical system 700*a* in a data transmission mode. In said data transmission mode, the optical source 712 is configured to output optical radiation at a wavelength of a first value. For example, the thermoelectric temperature adjustment module (not illustrated), e.g. a Peltier device, which may be coupled to the optical source 712 may not be applying a temperature change to the optical source 712 (or may be controlling the temperature such that it is within a first range that corresponds with the optical source outputting radiation within a first range) such that the optical source outputs optical radiation with a wavelength of the first value (i.e. within a first range within which the mirror filter 727 is not configured to direct reflected or backscattered radiation to the photodetector 714) to operate the system in the data transmission mode.

Thus, the characteristics of the optical filter arrangement and the first value of wavelength output by the optical source in the data transmission mode may be matched, for example, such that the pass band of the mirror filters comprising the optical filter arrangement are able to pass optical radiation at the wavelength of the first value.

Figure 7B:
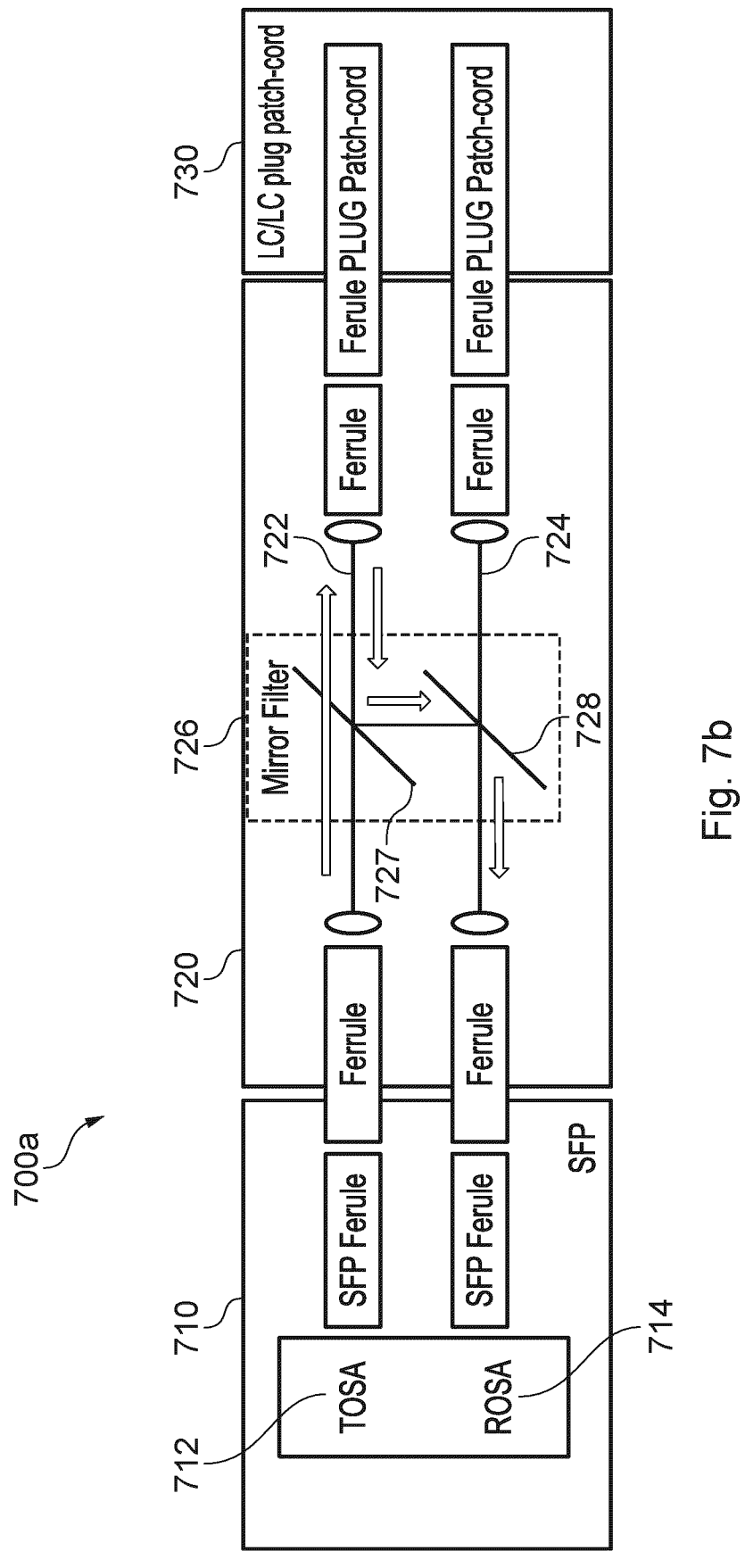

FIG. 7*b* illustrates a schematic example of the principle of operation of an optical system 700*b* in an OTDR mode. Elements common between FIG. 7*a* and FIG. 7*b* are presented with corresponding reference numerals. As described above, system 700*b* may illustrate a portion of systems 400*a* and 400*b* and thus may operate with at least some of the above-described functionality relating to systems 400*a* and 400*b*.

As described above, the optical system 700*b* may be operable in an OTDR mode where the wavelength of the optical radiation output by the optical source may be adjusted to a second value. The thermoelectric temperature adjustment module may thus be configured to adjust a temperature of the optical source to adjust the wavelength of the optical source radiation from a first wavelength to a second wavelength.

As illustrated in FIG. 7*b*, in the OTDR mode, with the optical radiation output from the optical source 712 at a wavelength of the second value into the transmission path 722, the optical filter arrangement 726 is configured to pass optical radiation into the first optical fibre. However, as illustrated in FIG. 7*b*, optical radiation of the second wavelength may be backscattered and/or reflected from within the first optical fibre or a downstream optical component connected to the first optical fibre. This backscattered and/or reflected radiation may be incident upon the first mirror filter 727, which is configured to reflect the backscattered and/or reflected radiation towards the second mirror filter 728 in the reception path 724. The backscattered and/or reflected radiation may thus be reflected from the second mirror filter 728 towards the photodetector 714 on the reception path 724, where it is detected.

The detected backscattered and/or reflected radiation may thus be analysed by downstream processing circuitry, such as processor 412 described with reference to FIGS. 4*a* and 4*b*. In the OTDR mode, with the optical source radiation output from the optical source at a wavelength of the second value, the first and second mirror filters 727, 728 may thus effectively act as an optical circulator. In other words, the mirror filters, e.g. TFF, reflect or pass a wavelength according to its direction and/or wavelength. The angle of the mirror filters, when reflecting, provides for transfer of an optical signal between the first and second optical fibres (waveguides).

Thus, in some examples, the first mirror filter 727 is configured to pass the optical source radiation from the optical source into the first optical fibre (or waveguide) and further configured to, responsive to the optical source radiation comprising a wavelength of the second value, direct the optical source radiation backscattered and/or reflected from the first optical fibre to the second mirror filter 728, where the second mirror filter is configured to direct the optical source radiation backscattered and/or reflected from the first optical fibre to the photodetector. In some examples, the optical plug 720 may comprise a reception path, or waveguide, for channeling optical radiation from a second optical fibre (or waveguide) to the photodetector, where responsive to the optical source radiation comprising a wavelength of the second value, the optical filter arrangement is configured to direct the optical source radiation backscattered and/or reflected from the first optical fibre to the reception path to direct the optical source radiation backscattered and/or reflected from the first optical fibre to the photodetector.

As described above, in order to avoid interference at the photodetector 714, in the OTDR mode, the second optical fibre connected to the reception path 724 of the optical plug 720 may not be used to transmit data signals to the photodetector 714. In a similar manner, the optical radiation output at the wavelength of the second value from the optical source may not be used for data transmission and may only be used for OTDR.

In some examples, the characteristics of the thermoelectric temperature adjustment module, the optical source 712 and the optical filter arrangement 726 may all be balanced to achieve the above-described functionality of the system 700*b* in the OTDR mode. For example, the thermoelectric temperature adjustment module and the optical source 712 may be configured such that the temperature adjustment provided by the thermoelectric temperature adjustment module adjusts the wavelength of the radiation output from the optical source 712 from the first value to an appropriate second value.

Referring again to FIG. 7*a*, in some examples, optical radiation output from the optical source 712 at a wavelength of the first value may be backscattered and/or reflected from sites within the first optical fibre. However, such optical radiation comprising a wavelength of the first value backscattered and/or reflected from sites within the first optical fibre may be passed by the optical filter arrangement 726. For example, such radiation may be incident upon the first mirror filter 727, which may pass said backscattered or reflected radiation towards the optical source 712. In this way, with the optical system configured in the data transmission mode, said backscattered and/or reflected radiation at the first wavelength may not be incident upon the photodetector 714 and thus may not interfere with the data signals transmitted along the second optical fibre and channeled through the reception path 724 towards the photodetector 714.

The characteristics of the optical filter arrangement, such as the first and second mirror filters may thus be configured accordingly based on the first and second wavelength values that may be output from the optical source 712.

Figure 7C:
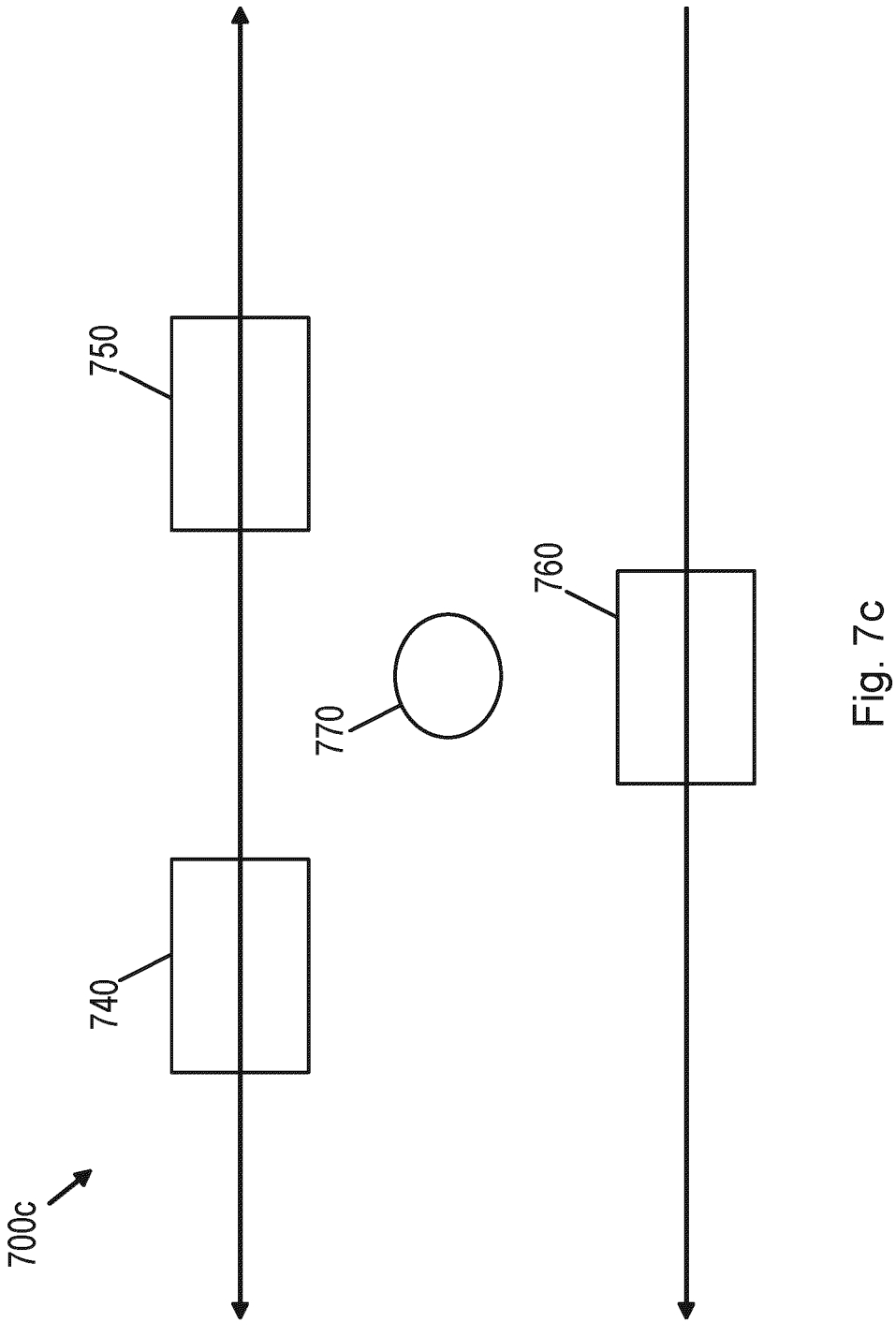
FIGS. 7c and 7d are schematic examples of an optical filter arrangement.
Figure 7D:
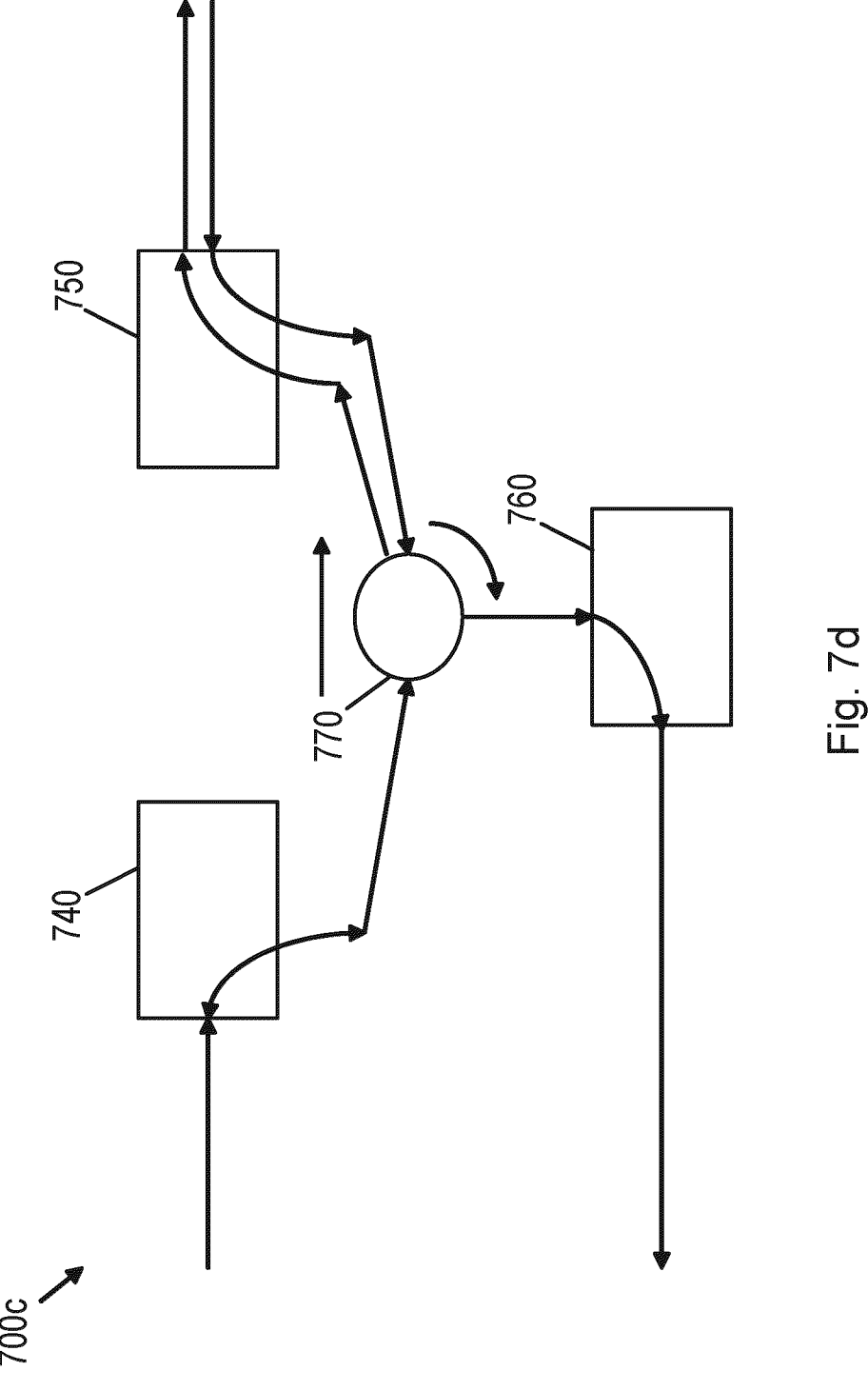

FIGS. 7*c* and 7*d* illustrate one example of an optical filter arrangement 700*c*, which in some examples, may comprise the optical filter arrangement 726 described above with reference to FIGS. 7*a* and 7*b*.

Referring to FIG. 7c, the optical filter arrangement 700c comprises first, second and third three-port optical filters 740, 750, 760. In some examples, the three-port optical filters 740-760 may be fabricated using thin film technology (i.e. a thin film filter, TFF). The optical filter arrangement 700c further comprises an optical circulator 770.

In some examples, the first and second three-port optical filters 740, 750 may be comprised in the transmission path of optical plug 720 and the third three-port optical filter 760 may be comprised in the reception path of optical plug 720.

FIG. 7c illustrates the behaviour of the optical filter arrangement 700c when a first wavelength is transmitted into the optical plug 720, such as during the data transmission mode described above. For example, the optical source 712 may transmit an optical signal comprising the first wavelength into a first port of the first three-port optical filter 740, which is configured to pass the first wavelength out of the second port of the first three-port optical filter 740. The first wavelength enters a first port of the second three-port filter 750, which in turn passes the first wavelength out of a second port of the second three-port filter 750 and into the first optical fibre (or waveguide). Similarly, any radiation at the first wavelength backscattered or reflected from the first optical fibre is passed by the first three-port filters 740 back towards the optical source 712, such that it does not enter the reception path and interfere with radiation at the photodetector 714.

The third three-port filter 760 is also configured to pass the first wavelength, such that an optical signal of the first wavelength received on the reception path from the second optical fibre passes through a first and second port of the third three-port filter 760 to the photodetector 714.

Thus, during the data transmission mode, radiation at the first wavelength does not pass via the circulator 770.

FIG. 7d illustrates the operation of the optical filter arrangement 700c when a second wavelength is transmitted into the optical plug 720, such as during the OTDR mode described above. The second wavelength may be output by the optical source 712 and enter the first port of the first three-port optical filter 740, which passes the second wavelength out of a third port of the first three-port optical filter 740. The second wavelength enters a first port of the optical circulator 770 and is transmitted out of a second port of the optical circulator 770 towards a third port of the second three-port optical filter 750. The second wavelength may then pass from the third port of second three-port optical filter 750 to the second port of second three-port optical filter 750 and into the first optical fibre. As such, the optical signal of the second wavelength enters the first optical fibre, and so is transmitted in on the same path as the first wavelength.

Radiation of the second wavelength which is reflected and/or backscattered from a remote point on first optical fibre enters the second port of the second three-port optical filter 750 and passes out of the third port of the second three-port optical filter 750. The second wavelength thus enters the second port of the optical circulator 770 and passes out of a third port of the optical circulator 770 towards the third three-port filter 760. The second wavelength thus enters a third port of the third three-port filter 760 and passes out of the second port of the third three-port filter 760 to be directed towards the photodetector 714 for detection. As such, a returning signal on the first optical fiber does not return to the optical source. Instead, the optical filter arrangement diverts the returning optical signal of the second wavelength to the photodetector, i.e. on the second optical fibre.

Optical filter arrangement 700c may thus comprise an arrangement in the transmission path and the reception path of an optical plug which in some examples can implement the functionality of the first and second 'mirror filters' described. It will be appreciated that optical filter arrangement 700c is one of example of a suitable optical filter arrangement and the skilled person will recognise that other examples of an optical filter arrangement may be configured according to the examples of the present disclosure.

The description above thus presents an optical hardware configuration, which can be used for either data transmission or for performing OTDR on an optical fibre.

Figure 8:
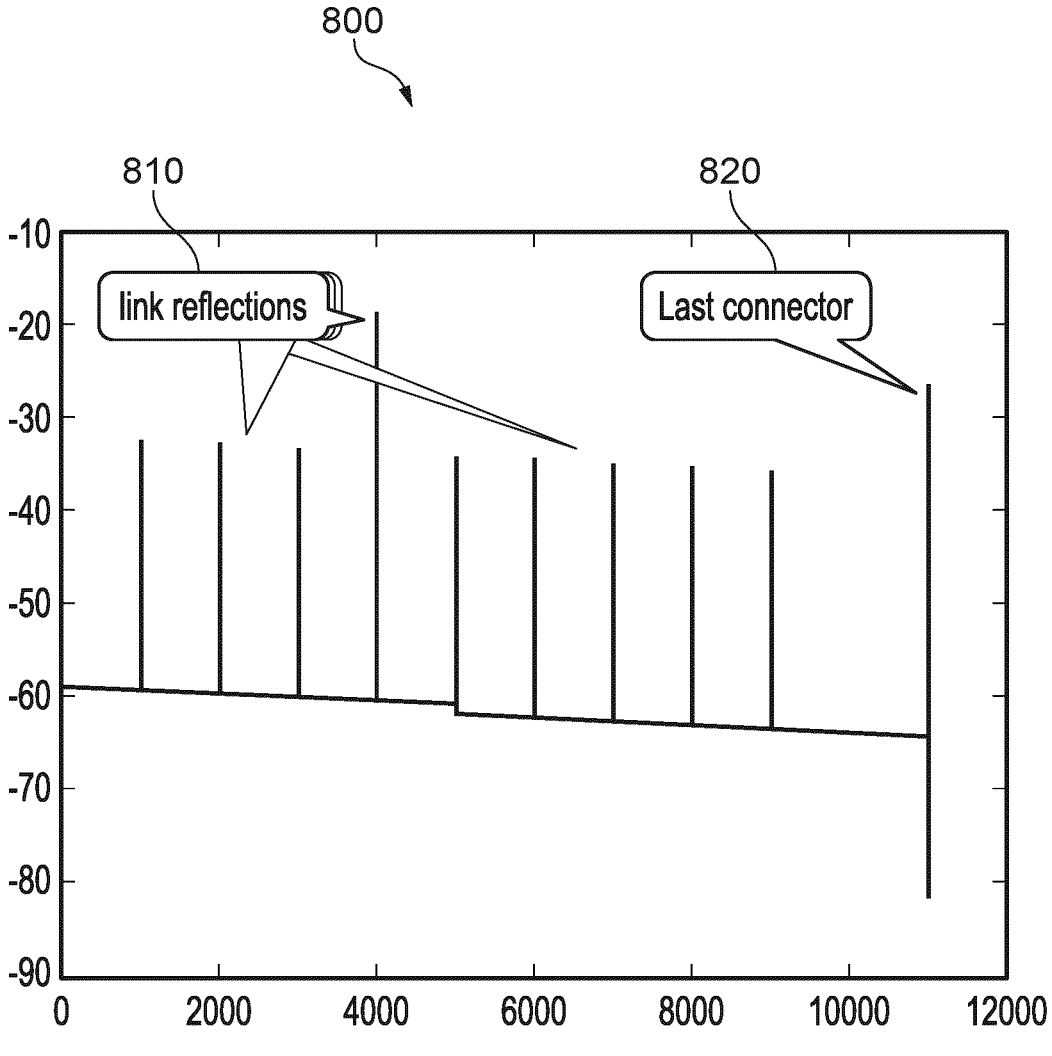
FIG. 8 is an example of an ideal OTDR trace.

FIG. 8 is an example of an OTDR trace 800 from which the locations of reflections along the optical fibre can be inferred. The OTDR trace may be based on an 11 km point-to-point (P2P) fibre link. In an OTDR trace, such as trace 900, the trace can be used to characterise the optical fibre, as the locations of reflections 910 along the optical fibre are be represented by peaks or spikes in the OTDR trace. In some examples, the reflections 910 may be due to splices at connector junctions. OTDR trace 900 further comprises a peak 920 representing the terminal connector of the optical fibre.

Conventionally, to obtain an OTDR trace, such as OTDR trace 900, which has peaks or spikes that represent reflections along the optical fibre, dedicated OTDR hardware is used. Typically, the optical fibre under test is disconnected from its usual position within an optical network, connected to the OTDR hardware, and optical radiation is transmitted into the optical fibre. Radiation backscattered and/or reflected from within the optical fibre is received at a photodetector of the OTDR hardware and converted into an analogue electrical signal. An ADC is then typically employed to convert the analogue electrical signal into a digital format for further processing.

An ADC may thus form a crucial part of an OTDR apparatus. However, in some configurations, such as that described above with reference to FIGS. 1-7b, it may be desirable to perform OTDR on an optical fibre in an apparatus where an ADC is not present, such as in an SFP transceiver.

Figures 9A, 9B:
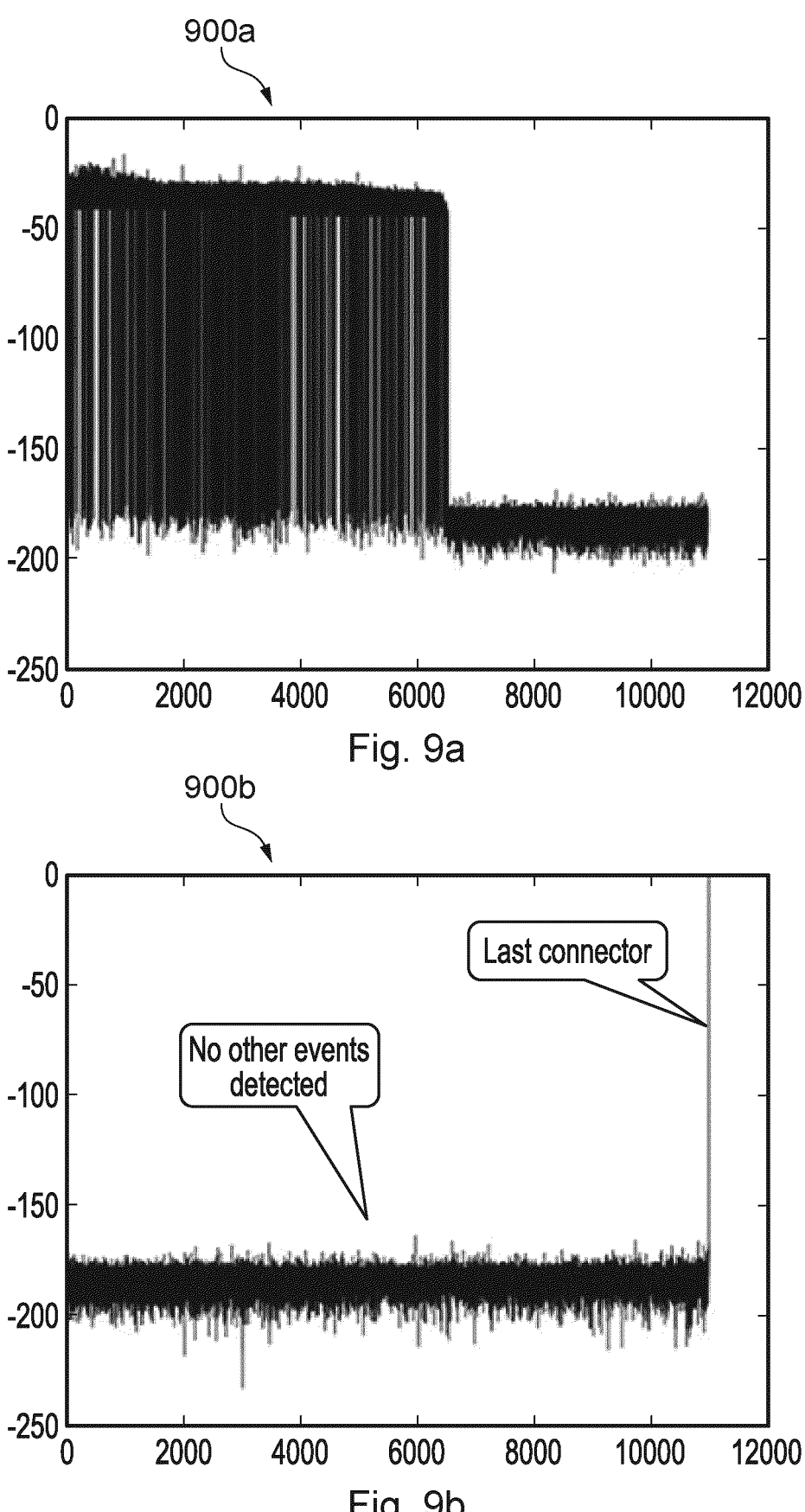
FIGS. 9a and 9b are examples of OTDR traces obtained without the use of an ADC.

FIGS. 9a and 9b illustrate examples of OTDR traces, 900a, 900b, which were obtained using an OTDR apparatus without an ADC (and without using the hardware according to embodiments described herein).

Referring to FIG. 9a, as illustrated, OTDR trace 900a does not comprise any distinguishable signals and thus the locations of scattering and reflection sites along the optical fibre cannot be determined. Furthermore, the terminal connector of the optical fibre cannot even be identified due to the noise present in the trace.

Referring to FIG. 9b, OTDR trace 900b was obtained with an OTDR apparatus in which a terminal reflector was position at the end of the optical fibre. Thus, as illustrated, with such a configuration, even without the use of an ADC, the end of the optical fibre can be identified due to the strong signal produced as a result of the reflector. With such a configuration, one-way link latency and, consequently, the latency asymmetry of the uplink and downlink fibers may be determined.

However, in some scenarios, such as when utilising the apparatus described above with reference to FIG. 1-7b, it may not be practical to position a terminal reflector at the end of the optical fibre. For example, positioning the terminal reflector may involve disconnecting the end of the optical fibre from a transceiver to properly position the terminal reflector. This would involve manual intervention at the site of the optical fibre, which as previously mentioned, the embodiments described herein endeavour to avoid.

Furthermore, as illustrated in OTDR trace 900*b*, the signals from the rest of the optical fibre cannot be distinguished from the noise and thus the locations of scattering and reflection sites cannot be identified along the optical fibre.

The description below sets forth methods and apparatus for obtaining an OTDR trace of an optical fibre, which may be used concurrently with the hardware described above.

FIG. 10 is a flowchart illustrating process steps in a method 1000 for performing OTDR on an optical fibre.

The method 1000 comprises, in step 1010, setting a decision threshold of a photodetector. In some examples, a decision threshold may configure the photodetector to output a value, for example, a '1' or a '0' based on an amplitude or intensity of radiation detected at the photodetector. For example, a '1' may be output if the detected radiation has an amplitude above the decision threshold and a '0' may be output if the detected radiation has an amplitude below the decision threshold. The decision threshold may be set in an SFP transceiver, for example as defined in the SFF-10472 standard.

The method 1000 further comprises, in step 1020, transmitting a first signal into an optical fibre wherein the first signal comprises a sequence of optical radiation pulses based on a coded sequence. In some examples, the coded sequence may comprise a Golay sequence and the optical radiation pulses may at least partly represent the Golay sequence. For example a pulse of the sequence of optical radiation pulses may represent one bit of the coded sequence.

The method 1000 further comprises, in step 1030, detecting optical radiation backscattered and/or reflected from the optical fibre using the photodetector. The 1000 further comprises, in step 1040, obtaining a measurement signal comprising bit sequences based on the detected optical radiation and the decision threshold of the photodetector. As described above, the measurement signal may be obtained comprising a series of high and low values, for example, '1' and '0', based on the amplitude of the detected backscattered and/or reflected optical radiation.

The method 1000 further comprises, in step 1050, comparing the measurement signal with the first signal to obtain a correlation signal. In some examples, the measurement signal and the first signal may thus be involved in a correlation process. Thus, in some examples, the coded sequence (on which the first signal is based) may be based on one or more codewords and comparing the measurement signal with the first signal to obtain the correlation signal may comprise correlating the measurement signal with the one or more codewords. In some examples, the one or more codewords may comprise pairs of bipolar codewords and the plurality of optical radiation pulses may each comprise a sequence of pairs of unipolar codewords derived from the pairs bipolar codewords. In some examples, the one or more codewords comprise pairs of complimentary Golay sequences.

As Golay sequences have the property that their out-of-phase aperiodic autocorrelation coefficients sum to zero, by correlating the measurement signal with the one or more codewords, the correlation signal may indicate points at which the signal is non-zero and points in the signal at which the measurement signal contains a codeword. This is therefore indicative of a point within the optical fibre at which some reflection or backscatter has occurred.

Thus, as one skilled in the art will be familiar with, the Golay codewords correlate to a Dirac delta function:

$$g \times g = \delta$$

where g is the Golay codewords and δ represents a Dirac delta function.

A first signal comprising radiation pulses based on a Golay codeword may thus be transmitted into an optical fibre and the signal of radiation reflected and/or backscattered from within the optical fibre is thus the convolution between a Golay codeword sequence and twice the fibre response. The fibre response identifies the locations of reflection and scattering sites along the fibre, as well as information on the attenuation of the optical fibre:

$$r = g * h$$

Where r is the signal of radiation reflected and/or backscattered from within the optical fibre, g is a golay codeword and h is twice the fibre response.

A cross correlation between the transmitted and received signal can thus be performed according to:

$$g \times r = g \times (g * h) = (g \times g) * h = h$$

The response of the fibre h can thus be obtained from the cross correlation because the sequences of the Golay codewords correlate to a Dirac delta function. Thus, through use of the Golay sequences and correlation OTDR techniques, the response of the fibre including the locations of reflections and scattering sites as well as attenuation can be obtained.

The method 1000 further comprises, in step 1060, adjusting the decision threshold of the photodetector. For example, the amplitude value associated with the decision threshold may be adjusted.

The method 1000 further comprises, in step 1070, repeating steps 1020-1060 to obtain a plurality of correlation signals. The method 1000 further comprises, in step 1080, combining the plurality of correlation signals to obtain an OTDR trace of the optical fibre. For example, the plurality of correlation signals may be subject to an averaging process to obtain the OTDR trace of the optical fibre. As will be described in further detail below, by obtaining a plurality of correlation signals, which in some examples, may each comprise an OTDR trace obtained with different decision threshold values, a combined or averaged OTDR trace of the optical fibre may be obtained, which can characterise reflections and scattering sites along the optical fibre, without the use of an ADC in the OTDR hardware setup.

Figure 11:
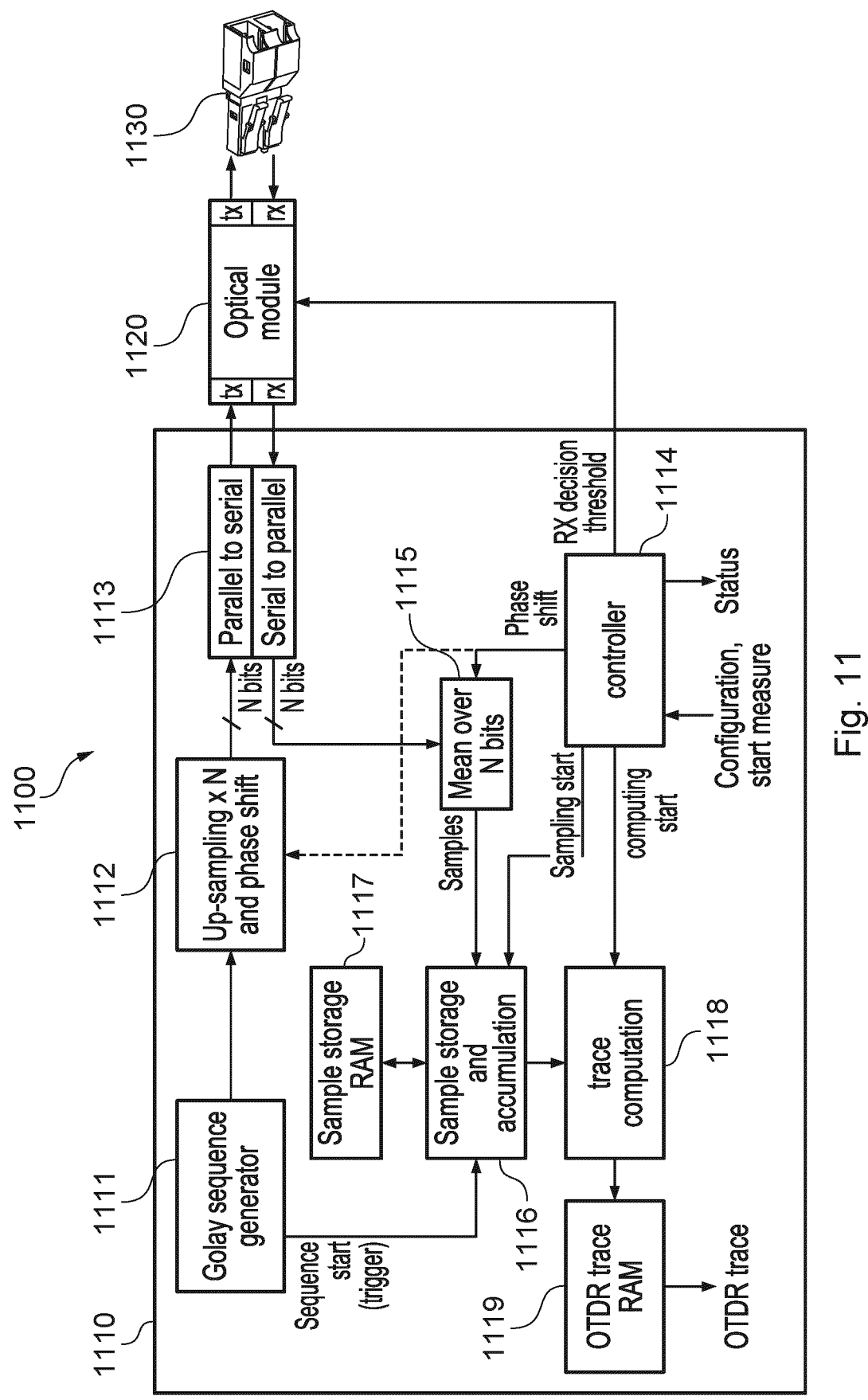
FIG. 11 is a block diagram illustrating functional modules in an example processor for performing OTDR on an optical fibre.

FIG. 11 illustrates a block diagram illustrating functional modules in an example apparatus 1100 for performing OTDR on an optical fibre according to the present disclosure. As will be described in more detail below, the apparatus 1100 does not comprise an ADC and may be configured to obtain an OTDR trace of an optical fibre, which is able to distinguish the terminal connector of the optical fibre and distinguish scattering and reflection sites along the optical fibre.

The apparatus 1100 comprises a processor 1110, a transceiver 1120 and an optical plug 1130. In some examples, the processor 1110, the transceiver 1120 and the optical plug 1130 may comprise the processor 412, the transceiver 414 and the optical plug 420 of FIGS. 4a and 4b. The processor 1110, transceiver 1120 and optical plug 1130, in some examples, may thus be operable to provide the above-described functionality as described with reference to FIGS. 1 to 7b.

Optical plug 1130 may thus provide a connection between transceiver 1120 and an optical fibre. The apparatus 1100 may be configured in an OTDR mode, such as by operation of the thermoelectric temperature adjustment module. In this mode, optical radiation, generated from the optical source of the transceiver 1120, may be transmitted into the optical fibre and radiation backscattered and/or reflected from the optical fibre may be received at the photodetector of transceiver 1120.

It will be appreciated that the apparatus 1100 may also be configured in a data transmission mode, as described above. However, the discussion with reference to FIG. 11 will focus on the OTDR mode, and on how an OTDR trace may be generated.

Processor 1100 comprises a sequence generator 1111, which in the illustrated example of FIG. 11, comprises a Golay sequence generator. Sequence generator 1111 may be configured to control the sequence of pulses output by the optical source of the transceiver 1120. As one skilled in the art will be familiar with, coded sequences such as Golay sequences may be transmitted into an optical fibre as a sequence of optical pulses where a single pulse of the sequence of optical pulses may represent one bit in the coded sequence.

In this example, the processor 1100 further comprises up-sampling and phase shift module 1112, which may be configured to apply a phase shift to one or more of the coded sequences generated by sequence generator 1111. As will be described in more detail below, in some examples, over-sampling the radiation backscattered and/or reflected from sites within the optical fibre may improve the signal noise ratio of the OTDR trace of the optical fibre. The processor 1100 further comprises parallel to serial register 1113, which is configured to output the coded sequence generated by the sequence generator (and optionally adjusted by the up-sampling and phase shift module 1112) to the transceiver 1120, one bit at a time.

The coded sequence generated by the sequence generator 1111 may thus be output to the transceiver 1120 to control the sequence of optical pulses that are output by the optical source of the transceiver 1120. The sequence of optical pulses are thus transmitted into the optical fibre via the optical plug 1130. Radiation backscattered and/or reflected from within the optical fibre is received at the photodetector of the transceiver via the optical plug 1130.

Processor 1100 further comprises a controller 1114, which is configured to set and adjust a decision threshold of the photodetector of the transceiver 1120. As described above, based on the amplitude of the radiation received at the photodetector, the transceiver 1120 may output a high or low value, for example '1' or '0', based on whether the amplitude of the radiation is above or below an amplitude set according to the decision threshold. The output of the transceiver 1120 may thus comprise a measurement signal comprising bit sequences, which can be compared with the coded sequences generated by the sequence generator 1111, transmitted into the optical fibre as a sequence of optical pulses. A coded sequence output by the photodetector of the transceiver may therefore be effectively matched and correlated with a bit sequence transmitted into the optical fibre.

As described above, bit sequences in the measurement signal output from the photodetector may overlap and correlate with the coded sequences that are transmitted into the optical fibre, for example based on golay sequences. Such a correlation may thus be indicative of light backscattered or reflected from a location along the optical fibre. These locations along the fibre can thus be determined based on correlation OTDR techniques.

The controller 1114 is further configured to adjust the decision threshold of the photodetector of the transceiver and the above-described OTDR process may again be performed, in which a coded sequence of optical pulses are transmitted into the fibre. A measurement signal comprising bit sequences may again be output from the photodetector of the transceiver and correlated with the coded sequence transmitted into the optical fibre. Coded sequences which correlate may thus again be indicative of the locations of scattering or reflection sites along the optical fibre, in a similar manner to the process described above. Thus, a plurality of OTDR traces may be obtained in this way by repeatedly adjusting the decision threshold and transmitting a sequence of optical pulses into the optical fibre.

However, as the decision threshold is adjusted each time, separate OTDR traces obtained with the different decision thresholds may be different and may thus reveal different information about the optical fibre.

For example, a first OTDR trace may be obtained when using a decision threshold set to a first value and reflections along the optical fibre may be determined. An OTDR trace of the same optical fibre may then be obtained with a decision threshold at a second value lower than the first value. The OTDR trace obtained with the decision threshold at a second value may reveal information that is not observable in the OTDR trace obtained with the decision threshold set at the higher value and vice versa. For example, the location of a scattering site may be observable in the OTDR trace obtained with the decision threshold at the second value, which is not observable in the OTDR trace obtained with the first value because the amplitude of radiation backscattered from the scattering site was not greater than the first value of the decision threshold.

Similarly, the OTDR trace, obtained with the second decision threshold value, would identify the reflections that are observable from the OTDR trace obtained with the first decision threshold value. However, the OTDR trace obtained with the decision threshold of the second value would not show the full amplitude of the reflections. For example, from the OTDR trace obtained with the decision threshold of the lower value, it may be indistinguishable whether the detections at the photodetector are due to reflections (which would have higher amplitudes) or scattering sites (which would have lower amplitudes). Reflected radiation is typically incident on the photodetector with a higher amplitude than backscattered light. As the decision threshold of the photodetector means that any detected radiation with an amplitude above the decision threshold is detected with a value e.g. '1', it may be indistinguishable whether the detected radiation has a value that greatly exceeds the threshold (so may be the result of a reflection) or exceeds the threshold by a small amount (so may be the result of a scattering site).

Thus, by adjusting the decision threshold and observing the information from each OTDR trace, different information of the detected radiation can eventually be determined, for example whether the detected radiation has a higher amplitude and is thus indicative of a reflection or whether the detected radiation has a lower amplitude and may thus be indicative of a scattering site.

Thus, by obtaining a plurality of OTDR traces of the optical fibre, each obtained with a different decision threshold and averaging the resultant OTDR traces, a combined or averaged OTDR trace may be obtained which includes the locations of scattering or reflection sites and the amplitude of backscattered or reflected radiation associated with a scattering or reflection site.

In some examples, the decision threshold may be set to any one of 256 values, for example, as specified in the SFF-8472 standard. Using a greater number of decision thresholds may improve the sensitivity of the obtained averaged OTDR trace. Obtaining OTDR traces across 256 values may emulate the acquisition process of an 8 bit ADC to obtain an accurate representation of the backscattered and/or reflected radiation from within the fibre. This use of a plurality of different decision thresholds may thus improves the sensitivity and resolution of performing OTDR with a transceiver that does not comprise an ADC. The result better describes the analog reflected signal compared to a simple 1-bit value, that would be obtained by operating a transceiver without an ADC, and without using multiple decision thresholds. The operation of adjusting the decision threshold of the transceiver over an increased number of values thus improves the dynamic range and therefore the detectability of the reflection and scattering sites. However, using a greater number of decision thresholds may increase the total acquisition time, due to an increased number of times that the optical pulses would be transmitted into the optical fibre, each time that the threshold is adjusted.

Processor 1110 may also be configured to reduce the noise of the averaged OTDR trace obtained of the optical fibre. Controller 1114 may set the decision threshold to a first value and may control the sequence generator 1111 to output a first set of sequences into the optical fibre. The resultant backscattered and/or reflected radiation may be detected at the photodetector, and an OTDR trace of the optical fibre may be determined. This process may be repeated with the decision threshold maintained at the first value. The OTDR traces obtained from this process may be used to average the noise present across all OTDR traces which may thus be removed from the final averaged OTDR trace, obtained based on adjusting the decision threshold of the photodetector, as described above.

Processor 1110 may be further configured to reduce the noise of the averaged OTDR trace obtained of the optical fibre by oversampling. This process may thus improve the sensitivity of the OTDR apparatus for detecting the locations of scattering sites and reflections. As described above, processor 1112 comprises up-sampling and phase shift module 1112, which may be configured to apply a phase shift to one or more of the coded sequences generated by sequence generator 1111. Controller 1114 may be configured to control the up-sampling and phase shift module 1112 to apply the phase shift.

In some examples, the phase shift may be applied for a first decision threshold value and the phase shift may also be applied for subsequent decisions thresholds. In this way the noise of the averaged OTDR may also be reduced. In some examples, the transceiver 1120 may operate at 10 Gb/s and the OTDR can generate pulses at 250 b/s. Thus, in such examples, an oversampled factor of 40 can be applied to reduce noise and increase sensitivity.

Processor 1110 thus comprises acquisition module 1115, which, averages obtained measurement signals over N sample phase shifts, applied by phase shift module 1112.

Processor 1110 thus further comprises sample and storage accumulation module 1116 and sample storage memory 1117. These modules may operate together to sample the OTDR data, based on which an OTDR trace may be generated. Processor 1110 further comprises trace computation module 1118 and OTDR trace memory 1119, which may be configured to: obtain the plurality of OTDR traces obtained with the different decision thresholds; and average the traces to obtain a resultant averaged OTDR trace of the optical fibre.

Figure 12:
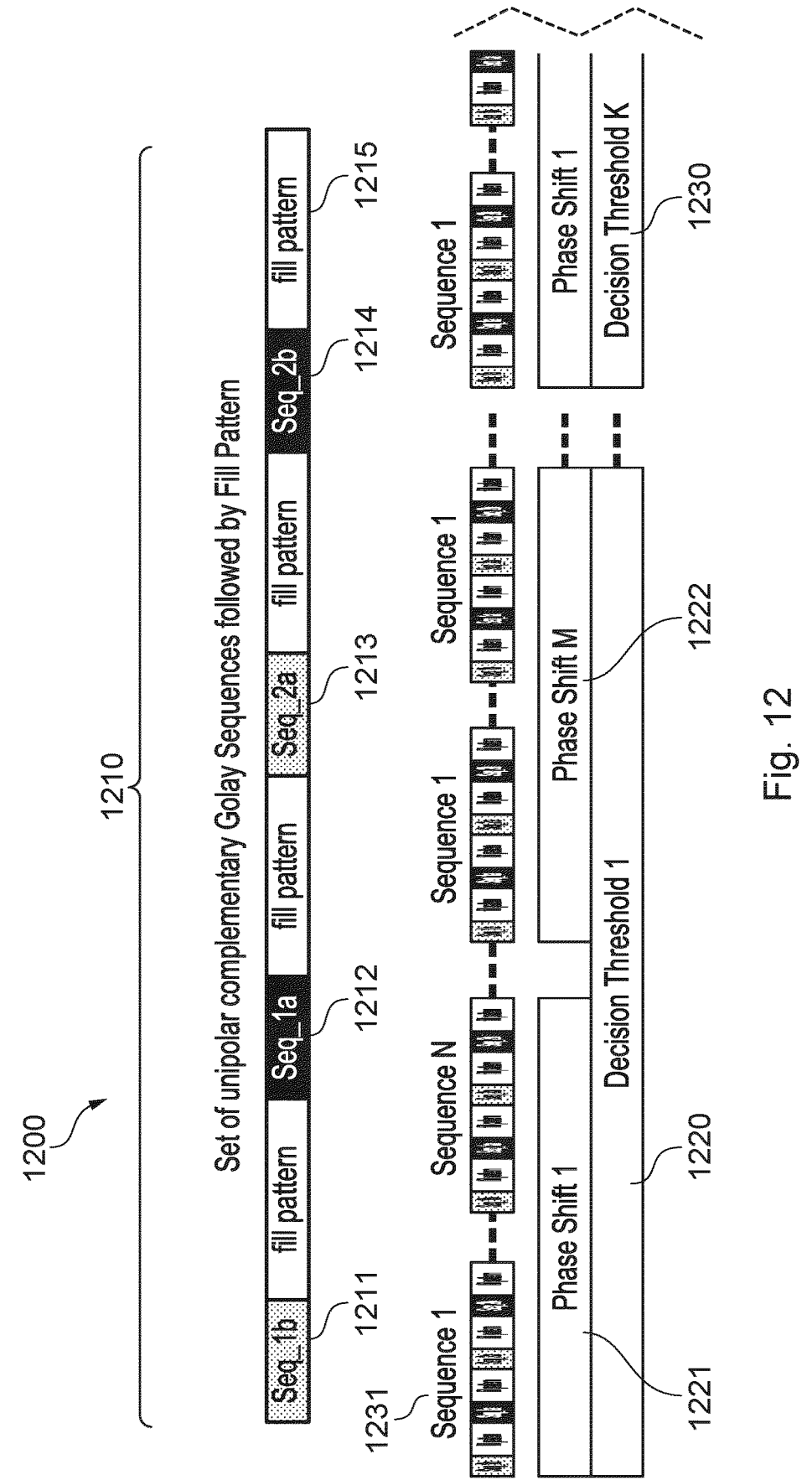
FIG. 12 is a schematic example of applying a phase shift to coded optical pulses.

FIG. 12 illustrates a schematic example 1200 of applying a phase shift to sequences of optical pulses. Example 1200 illustrates how a phase shift may be applied to optical pulses based on Golay codes.

As illustrated in FIG. 12, a first signal 1210 may be transmitted into an optical fibre comprising a sequence of optical radiation pulses based on a coded sequence, which in the illustrated example of FIG. 12 is based on a Golay code. As one skilled in the art will be familiar with, Golay codes consist of two complementary codewords, which each have to be converted to unipolar form to be represented by optical pulses for transmission into an optical fibre. Two unipolar sequences thus represent each of the codewords.

First signal 1210 thus comprises four sub-sequences of optical pulses 1211-1214. First sub-sequence 1211 and second sub-sequence 1212 represent the first complementary codeword, and third sub-sequence 1213 and fourth sub-sequence 1214 represent the second complementary codeword.

First signal 1210 further comprises a fill pattern 1215, which separates each of the unipolar sub-sequences. The fill pattern 1215 may be applied to avoid overlap between the backscattered and/or reflected sub-sequences 1211-1214. In some examples, the fill pattern 1215 separating each of the sub-sequences of optical radiation pulses may be identical. In such examples, the identical fill patterns may thus cancel out in the OTDR processing and thus may not interfere with the sub-sequences 1211-1214.

In some examples, the fill pattern 1215 may comprise a binary sequence comprising high and low values of the binary sequence. For example, the fill pattern may comprise a sequence of optical pulses representing a sequence of '1' and '0' values. In some examples, a fill pattern comprising only low values may cause the photodetector to enter squelching mode. Thus, the use of a fill pattern comprising low and high values may avoid the photodetector entering squelching mode.

In some examples, the fill pattern comprises a number N of '0' values, where N is an integer number, and a number M of '1' values, where M is an integer number. The numbers N and M are approximately equal, for example, $|N-M| \leq 2$. In some examples, the fill pattern comprises an equal number of '1' and '0' values. The fill pattern may comprise a binary sequence of alternate '1' and '0' values. A balanced number of '1' and '0' values provides for a constant mean signal which may be beneficial in case of AC coupling.

Referring again to FIG. 12, the decision threshold of the photodetector may thus be set to a first decision threshold value 1220. A plurality of sequences of optical pulses 1231 corresponding to the first signal 1210 may thus be transmitted into the optical fibre and the resulting backscattered and/or reflected radiation detected. This plurality of sequences of optical pulses 1231 may thus be transmitted into the optical fibre at a first phase shift value 1221. The phase shift may be adjusted to a second phase shift value 1222 and the same plurality of sequences of optical pulses 1231 corresponding to the first signal 1210 may thus be transmitted into the optical fibre and the resulting backscattered and/or reflected radiation detected. The second phase shift value is applied whilst the decision threshold is maintained at the first value 1220. In this way, the OTDR process according to examples of the present disclosure may be oversampled at each of the decision threshold values based on applying a plurality of phase shifts to the sequence of optical pulses launched into the optical fibre. The decision threshold may thus be adjusted to a second value 1230 and the phase shift and oversampling process may be repeated again.

The illustrated example of FIG. 12 shows two phase shifts being applied at a decision threshold value. However, it will be appreciated that in other examples, more than two phase shifts may be applied.

Referring again to FIG. 11, controller 1114 may thus be operable to control up-sampling and phase shift module 1112 to apply a phase shift to sequences generated by the sequence generator 1111. Controller 1114 may also supply the phase shift information to acquisition module 1115, which subsequently averages the samples obtained at a given threshold accordingly. Acquisition module 1115 further supplies the averaged samples to sample storage and accumulation module 1116, which may communicate with sample storage memory 1117 to store samples. Sample storage and accumulation module 1116 may thus average the samples across each decision threshold value to reduce the noise of the final averaged OTDR trace obtained from the plurality of decision thresholds.

Thus, in some examples, transmitting the first signal into the optical fibre may comprise transmitting a plurality of signals corresponding to the first signal into the optical fibre, wherein the plurality of signals are phase shifted with respect to each other. Obtaining the measurement signal may thus comprise oversampling the detected optical radiation from the plurality of signals.

Figures 13A, 13B:
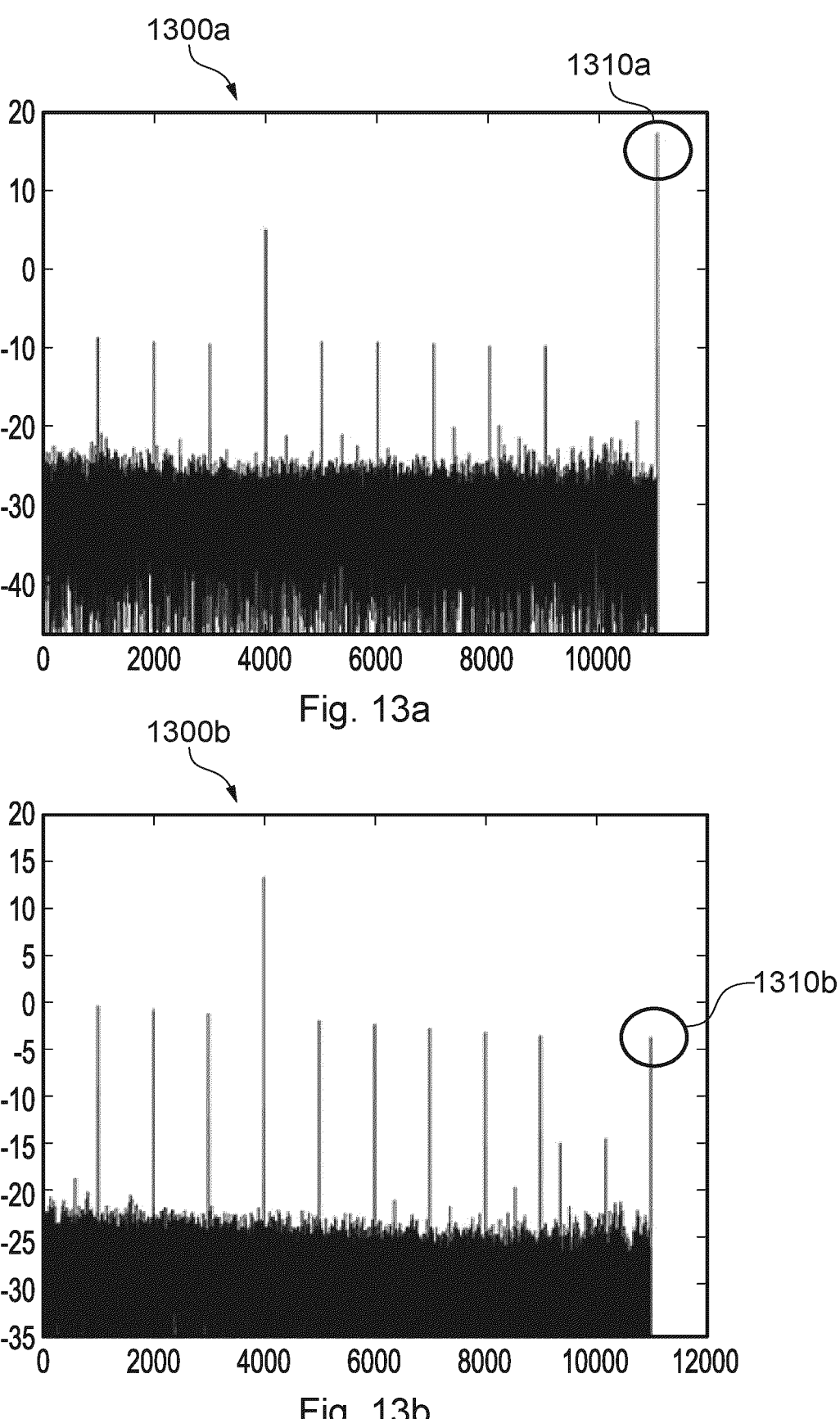
FIGS. 13a and 13b are examples of OTDR traces obtained without the use of an ADC.

FIGS. 13*a* and 13*b* illustrate OTDR traces 1300*a* and 1300*b* obtained by correlation OTDR techniques according to the present disclosure. The example OTDR traces 1300*a* and 1300*b* were obtained using 100 different decision threshold values. OTDR trace 1300*a* was obtained with the use of a terminal reflector at the end opposite the launch end of the optical fibre. As illustrated, the reflection 1310*a*, at the end of the optical fibre can be detected with a high amplitude. OTDR trace 1300*b* was obtained without the use of a terminal reflector. However, as illustrated in trace 1300*b*, the last reflection 1310*b* is still distinguishable in OTDR trace 1300*b*, obtained without a reflector. Thus, the OTDR technique according to examples of the present disclosure can produce an OTDR trace where the last reflection can be accurately determined without the use of a reflector. The latency of the optical fibre may thus be determined by methods and apparatus according to the present disclosure. As further illustrated in FIGS. 13*a* and 13*b*, further information characterising the optical fibre, such as the locations of reflections and scattering sites can be identified from the peaks within the OTDR traces.

Examples according to the present disclosure thus present an OTDR technique which can characterise an optical fibre and identify the terminal connection of an optical fibre, for example, with low time resolution of 1 ns. The OTDR technique according to the present disclosure can thus be used for latency measurements of optical fibres for 5G networks.

Furthermore, OTDR techniques according to the present disclosure present an apparatus which can be conveniently configured for OTDR based on a SFP transceiver commonly used for data transmission in optical fibre networks. This apparatus can be used to generate an OTDR trace of an optical without the need for a terminal reflector, which thus removes the need to connect the optical fibre to dedicated OTDR hardware. Examples according to the present disclosure thus present an OTDR technique that can be run both real time and remotely.

Examples according to the present disclosure further present an OTDR technique that can determine the locations of events along the fibre, such as reflections and scattering sites, without the use of an ADC. Transceivers commonly used for data transmission, such as an SFP transceiver, may not comprise an ADC and thus, examples according to the present disclosure may use such a transceiver to determine further information of an optical fibre. Operating a 1 bit transceiver according to the present disclosure where a decision threshold can be set to 256 levels can thus emulate the operation of an 8 bit ADC, which can thus reveal information such as the locations of reflections and scattering sites along the optical fibre.

Examples according to the present disclosure further present an apparatus in which the wavelength of an optical source may be adjusted easily and at a reduced cost (compared to an apparatus such as a tuneable laser) through the use of a Peltier device. The apparatus can thus adjust the wavelength of, for example, an SFP transceiver that are commonly used in optical networks.

FIG. 14 illustrates a method for performing optical time domain reflectometry, OTDR, on an optical fibre according to some embodiments.

In step 1401 the method comprises transmitting a first signal into an optical fibre, wherein the first signal comprises a sequence of optical radiation pulses based on a coded sequence, wherein each of the sequence of optical radiation pulses are separated by a fill pattern controlled by a binary sequence of high and low values.

The discussion above in reference to FIG. 12 utilises a fill pattern containing high and low values in related to ADC-less operation for example as described with reference to FIG. 10. However, this fill pattern may also be used with OTDR that uses an ADC.

The use of this fill pattern would also be suitable for implementation with a commercial transceiver (e.g. a pluggable SFP).

Currently there are no implementations of OTDR in the art that allow for the exploitation of SFP transceivers. For example, current systems may utilize a fill pattern comprising all zeros between coded sequences making it difficult to use with standard SFPs modules. Standard SFPs will, if no input is present, enter a squelching mode or will provide random output that creates interference with the coded sequence.

In some examples, the method of FIG. 14 further comprises receiving a detected signal of optical radiation backscattered and/or reflected from the optical fibre using the photodetector; and correlating the detected signal with the first signal to obtain an OTDR trace of the optical fibre.

Figure 15:
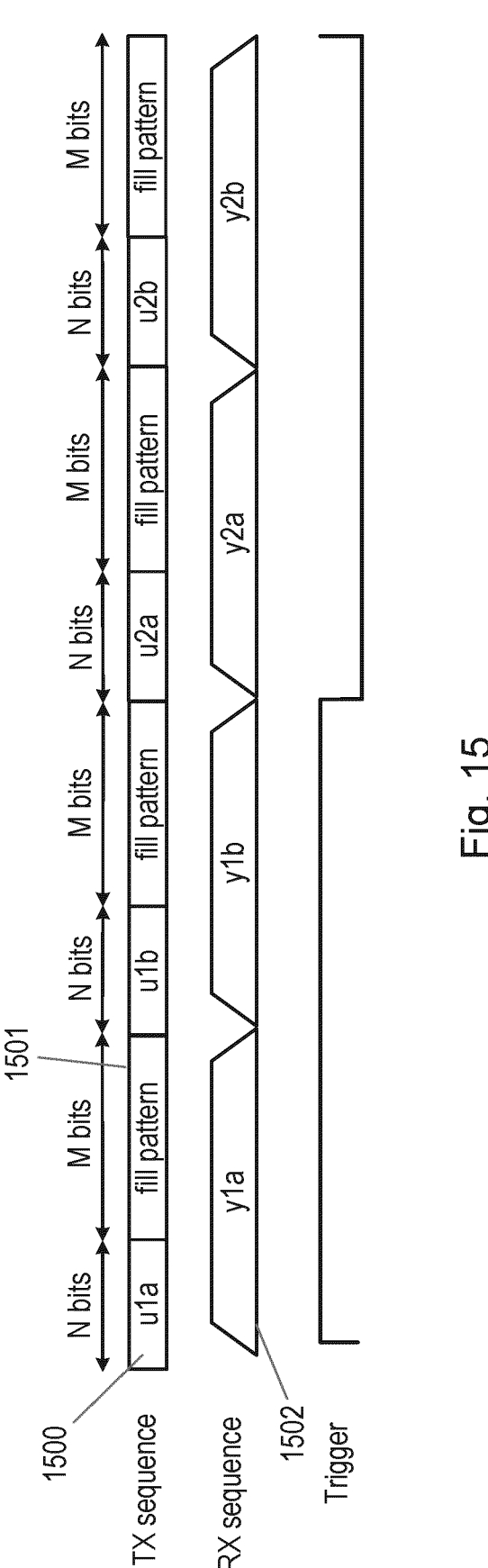
FIG. 15 illustrates an example of a transmitted first signal 1500 and a received detected signal.

FIG. 15 illustrates an example of a transmitted first signal 1500 and a received detected signal 1502. The first signal 1500 comprises a fill pattern 1501 according to embodiments described herein.

The coded sequence from which the first signal is derived is based on one or more codewords. In this example, the one or more codewords comprise pairs of bipolar codewords (u1a, u1b and u2a, u2b) and the plurality of optical radiation pulses in the first signal 1500 each comprise a sequence of pairs of unipolar codewords derived from the pairs bipolar codewords.

The fill pattern 1501 may comprise any pattern with sufficient "1" and "0" value alternations to avoid squelching or loss of synchronization. For example, the fill pattern 1501 may comprise a balanced sequency of "1" and "0" such as alternating "1"s and "0"s e.g. "101010". In other words, the fill pattern may comprise N 0s, where N is an integer number, and M 1s, where M is an integer number. For example, a magnitude of a difference between N and M is less than a predetermined threshold, e.g. 1 or 2, e.g. |N−M|≤2. In some examples, the fill pattern may comprise an equal number of 1s and 0s. A balanced pattern as described herein may keep a constant mean signal which may be beneficial in case of AC coupling, for example, if the first signal comprises AC signals.

In some examples, the '1' and '0' values correspond to an optical transmitter being switched 'on' and 'off' respectively. Embodiments may be used with a pluggable transceiver, e.g. SFP, which provides an electrical output based only on detected transitions between the reflected received optical values. As such, the embodiments are usable with the received electrical signal being AC coupled to the optical fibre (as distinct from being DC coupled). This allows OTDR to be carried out using a standard pluggable transceiver, e.g. SFP.

In the example illustrated in FIG. 15, the coded sequence comprises 2 complementary Golay sequences each of which is made of two unipolar sequences (since the Golay code is bi-polar). It will be appreciated that other types of sequence may be used.

After each of the four sub-sequences the fill pattern is applied to avoid overlap between the reflected sub-sequences. In order to avoid overlap between the reflected sub-sequences, the time taken to transmit the fill pattern may be longer than a round trip time of the optical fibre. In other words, the fill pattern may be designed to comprise enough bits so that the time taken to transmit the fill pattern is longer than a round trip time for the coded sequence on the optical fibre.

Given that this fill pattern is identical for all four sub-sequences, the fill pattern does not provide any interference with the coded bits. The fill pattern cancels out when the post-processing evaluates the difference between the two received subsequences. It will be appreciated that any binary sequence that is replicated identically between the various coded sequences may be used. In particular, a binary sequency that utilizes a sufficient transition rate to keep the receiver synchronized may be used.

The first signal 1500 comprises Golay Sequences of N bits. In particular, u1a, u1b=NOT (u1a), u2a, u2b=NOT (u2a) are the unipolar sequences each comprising N bits comprising binary values. The fill pattern 1501 comprises M bits of distance between sequences to avoid interference. As previously described the maximum fiber distance is proportional to M.

The detected signal comprises the sequences y1a, y1b, y2a, y2b, each comprising N+M samples of real values.

To generate an OTDR trace, the following correlation may be performed:

$$[xcorr(y1a-y1b, u1a-u1b) + xcorr(y2a-y2b, u2a-u2b)]/M/2, \text{ where}$$

$$xcorr(i) = \sum_{n=0}^{N-1} r(i+n) \cdot t(n) \text{ for } i = 0 \text{ to } M - 1,$$

$$r = yxa - yxb, t = uxa - uxb$$

The fill pattern, M bits inserted between sequences, doesn't influence the result since yxa−yxb=0 and y2a−y2b=0 if the same pattern is sent.

Figure 16:
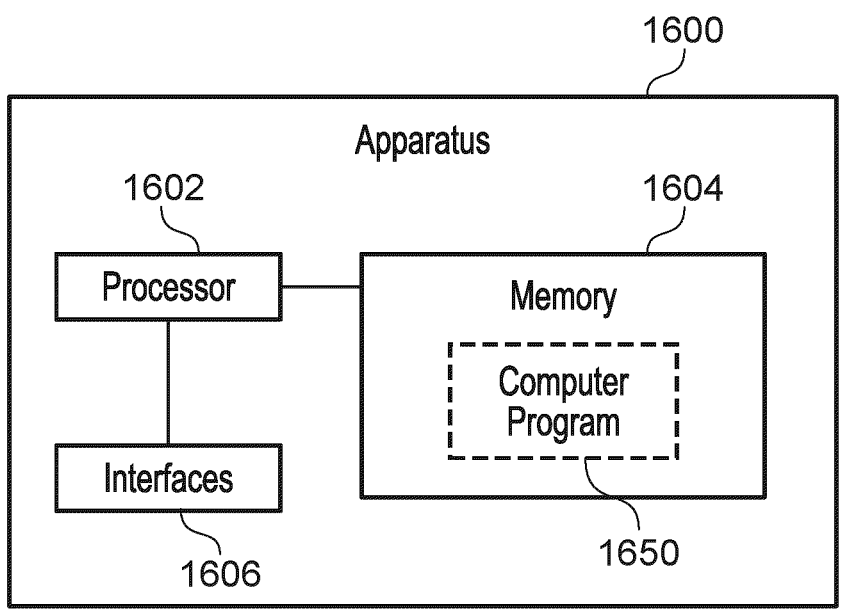
FIG. 16 is a block diagram illustrating functional modules in an example apparatus for performing OTDR on an optical fibre.

FIG. 16 is block diagram illustrating functional modules in an apparatus 1600 which may implement the method 1000, as illustrated in FIG. 10, according to examples of the present disclosure, for example on receipt of suitable instructions from a computer program 1650. Referring to FIG. 16, the apparatus 1600 comprises a processor or processing circuitry 1602, and may comprise a memory 1604 and interfaces 1606. The processing circuitry 1602 is operable to perform some or all of the steps of the method 1000 as discussed above with reference to FIG. 10 or the method 1400 as described above with reference to FIG. 14. The memory 1604 may contain instructions executable by the processing circuitry 1602 such that the apparatus 1600 is operable to perform some or all of the steps of the method 1000 as discussed above with reference to FIG. 10. The instructions may also include instructions for executing one or more telecommunications and/or data communications protocols. The instructions may be stored in the form of the computer program 1650. In some examples, the processor or processing circuitry 1602 may include one or more microprocessors or microcontrollers, as well as other digital hardware, which may include digital signal processors (DSPs), special-purpose digital logic, etc. The processor or processing circuitry 1602 may be implemented by any type of integrated circuit, such as an Application Specific Integrated Circuit (ASIC), Field Programmable Gate Array (FPGA) etc. The memory 1604 may include one or several types of memory suitable for the processor, such as read-only memory (ROM), random-access memory, cache memory, flash memory devices, optical storage devices, solid state disk, hard disk drive etc. The apparatus 1600 may further comprise interfaces 1606 which may be operable to facilitate communication with a wireless device and/or with other communication network nodes over suitable communication channels.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope. References to radiation pulses may alternatively be considered as an optical signal or wavelength.

Paragraphs

1. A method for performing optical time domain reflectometry, OTDR, on an optical fibre, the method comprising:
   a) setting a decision threshold of a photodetector;
   b) transmitting a first signal into an optical fibre, wherein the first signal comprises a sequence of optical radiation pulses based on a coded sequence;
   c) detecting optical radiation backscattered and/or reflected from the optical fibre using the photodetector;
   d) obtaining a measurement signal comprising bit sequences based on the detected optical radiation and the decision threshold of the photodetector;
   e) comparing the measurement signal with the first signal to obtain a correlation signal;
   f) adjusting the decision threshold of the photodetector;
   g) repeating steps (b)-(f) to obtain a plurality of correlation signals; and
   e) combining the plurality of correlation signals to obtain an OTDR trace of the optical fibre.

2. A method according to paragraph 1 wherein the coded sequence is based on one or more codewords and comparing the measurement signal with the first signal to obtain the correlation signal comprises correlating the measurement signal with the one or more codewords.

3. A method according to paragraph 2 wherein the one or more codewords comprise pairs of bipolar codewords and the plurality of optical radiation pulses each comprise a sequence of pairs of unipolar codewords derived from the pairs bipolar codewords.

4. A method according to paragraph 2 or 3 wherein the one or more codewords comprise pairs of complimentary Golay sequences.

5. A method according to any preceding paragraph wherein each pulse of the sequence of optical radiation pulses comprises one bit of the coded sequence.

6. A method according to any preceding paragraph wherein each of the plurality of optical radiation pulses are separated by a fill pattern.

7. A method according to paragraph 6 wherein the fill pattern separating each of the plurality of optical radiation pulses is identical.

8. A method according to paragraph 7 wherein the fill pattern comprises a binary sequence comprising high and low values of the binary sequence.

9. A method according to any preceding paragraph wherein the step of transmitting the first signal into the optical fibre comprises:
   transmitting a plurality of signals corresponding to the first signal into the optical fibre, wherein the plurality of signals are phase shifted with respect to each other; and
   wherein obtaining the measurement signal comprises oversampling the detected optical radiation from the plurality of signals.

10. A method according to any preceding paragraph wherein the first signal is generated by an optical source and wherein the optical source and the photodetector are comprised in a small form-factor pluggable, SFP, transceiver.

11. A method according to any preceding paragraph wherein combining the plurality of correlation signals to obtain an OTDR trace of the optical fibre comprises averaging the plurality of correlation signals to obtain the OTDR trace of the optical fibre.

12. A computer program product comprising a computer readable medium, the computer readable medium having computer readable code embodied therein, the computer readable code being configured such that, on execution by a suitable computer or processor, the computer or processor is caused to perform a method as in any one of paragraphs 1 to 11.

13. An apparatus for performing optical time domain reflectometry, OTDR, on an optical fibre, the apparatus comprising processing circuitry configured to:
    a) set a decision threshold of a photodetector;
    b) transmit a first signal into the optical fibre, using an optical source, wherein the first signal comprises a plurality of optical radiation pulses each comprising a coded sequence;
    c) detect optical radiation backscattered and/or reflected from the optical fibre using the photodetector;
    d) obtain a measurement signal comprising bit sequences based on the detected optical radiation and the decision threshold of the photodetector;
    e) compare the measurement signal with the first signal to obtain a correlation signal;
    f) adjust the decision threshold of the photodetector;
    g) repeat steps (b)-(f) to obtain a plurality of correlation signals; and
    e) combine the plurality of correlation signals to obtain an OTDR trace of the optical fibre.

14. An apparatus according to paragraph 13, wherein the processing circuitry is further configured to perform any of the steps of paragraphs 2 to 11.

15. An optical plug for providing a connection between a transceiver, a first optical fibre and a second optical fibre, wherein the transceiver comprises an optical source and a photodetector, wherein the optical source is configured to output optical source radiation at a first wavelength or a second wavelength, the optical plug comprising:
    a transmission path for channeling the optical source radiation from the optical source into the first optical fibre;
    a reception path for channeling optical radiation from the second optical fibre to the photodetector;
    an optical filter arrangement configured to pass the optical source radiation from the optical source into the first optical fibre;
    wherein:
       responsive to the optical source radiation being the first wavelength, the optical filter arrangement is further configured to pass optical source radiation backscattered and/or reflected from within the first optical fibre along the transmission path; and
       responsive to the optical source radiation being the second wavelength, the optical filter arrangement is further configured to direct optical source radiation backscattered and/or reflected from the first optical fibre to the reception path and to the photodetector.

16. An optical plug according to paragraph 15 wherein the optical filter arrangement is further configured to pass optical radiation of the first wavelength from the second optical fibre to the photodetector along the reception path.

17. An optical plug according to paragraphs 15 or 16, wherein the optical filter arrangement comprises a first mirror filter in the transmission path and a second mirror filter in the reception path.

18. An optical plug according to paragraph 17 wherein the first mirror filter is configured to pass the optical source radiation from the optical source into the first optical fibre and further configured to, responsive to the optical source radiation being the second wavelength, direct the optical source radiation backscattered and/or reflected from the first optical fibre to the second mirror filter; wherein the second mirror filter is configured to direct the optical source radiation backscattered and/or reflected from the first optical fibre to the photodetector.

19. An optical plug according to paragraph 17 or 18 wherein the second mirror filter is configured to pass optical radiation of the first wavelength, from the second optical fibre to the photodetector.

20. An optical plug according to paragraphs 13 to 19 wherein the first wavelength and the second wavelength are separated by about 5 nm.

21. A fibre optic system comprising:
   at least one optical fibre;
   a transceiver; and
   an optical plug according to any of paragraphs 15-20 connecting the transceiver and the at least one optical fibre.

22. A fibre optic system according to paragraph 21 wherein the transceiver comprises:
   an optical source for outputting optical source radiation; and
   a thermoelectric temperature adjustment module configured to adjust a temperature of the optical source to adjust the wavelength of the optical source radiation from the first wavelength to the second wavelength.

23. A fibre optic system according to paragraph 22 wherein the thermoelectric temperature adjustment module comprises a Peltier device.

24. A fibre optic system according to paragraph 22 or 23 wherein the thermoelectric temperature adjustment module is configured to adjust the temperature of the optical source by about 50 K.

25. A fibre optic system according to any of paragraphs 21 to 24 wherein the transceiver comprises a small form-factor pluggable, SFP, transceiver.

The invention claimed is:

1. A method for performing optical time domain reflectometry (OTDR) on an optical fibre using a transceiver comprising an optical source and a photodetector having an adjustable decision threshold, wherein the transceiver interfaces to a near end of the optical fibre through an optical plug comprising an optical filter arrangement that prevents backscattered or reflected light from the optical fibre from reaching the photodetector when the optical source outputs optical radiation at a first wavelength used for communicating with a remote transceiver at a far end of the optical fibre, and directs backscattered or reflected light from the optical fibre to the photodetector when the optical source outputs optical radiation at a second wavelength used for performing OTDR, the method comprising:
   setting the decision threshold of the photodetector to each of a plurality of decision threshold values and, for each decision threshold value:
      transmitting a first signal into the optical fibre, wherein the first signal is at the second wavelength and comprises a sequence of optical radiation pulses based on a coded sequence, wherein the sequence of optical radiation pulses are separated by a fill pattern controlled by a binary sequence of high and low values;
      obtaining a measurement signal comprising bit sequences based on optical radiation detected by the photodetector using the decision threshold value, the optical radiation being backscattered or reflected light from transmission of the first signal into the optical fibre; and
      comparing the measurement signal with the first signal to obtain a correlation signal for the decision threshold value; and
   combining the plurality of correlation signals to obtain an OTDR trace of the optical fibre.

2. The method according to claim 1, wherein the coded sequence is based on one or more codewords.

3. The method according to claim 2, wherein the one or more codewords comprise pairs of bipolar codewords and the sequence of optical radiation pulses comprises a sequence of pairs of unipolar codewords derived from the pairs bipolar codewords.

4. The method according to claim 2, wherein the one or more codewords comprise pairs of complimentary Golay sequences.

5. The method according to claim 1, wherein each pulse of the sequence of optical radiation pulses comprises one bit of the coded sequence.

6. The method according to claim 1, wherein the fill pattern separating each of the plurality of optical radiation pulses is identical.

7. The method according to claim 1, wherein the fill pattern comprises N 0s, where N is an integer number, and M 1s, where M is an integer number and wherein $|N-M| \leq 2$.

8. The method according to claim 1, wherein the fill pattern comprises an equal number of 1s and 0s.

9. The method according to claim 1, wherein the fill pattern comprises a binary sequence of alternate 1s and 0s.

10. The method according to claim 1, wherein the transceiver is a small form-factor pluggable (SFP) transceiver.

11. The method according to claim 1, wherein the first signal comprises AC signals.

12. The method according to claim 1, wherein a time taken to transmit the fill pattern is longer than a round trip time of the optical fibre.

13. An apparatus for performing optical time domain reflectometry (OTDR) on an optical fibre, the apparatus comprising:
   a transceiver comprising a transmitter configured to output optical radiation into the optical fibre and a photodetector configured to detect optical radiation incoming from the optical fibre, the photodetector having an adjustable decision threshold;
   an optical plug comprising an optical filter arrangement that prevents backscattered or reflected light from the optical fibre from reaching the photodetector when the transmitter outputs optical radiation at a first wavelength used for communicating with a remote transceiver at a far end of the optical fibre, and directs backscattered or reflected light from the optical fibre to the photodetector when the transmitter outputs optical radiation at a second wavelength used for performing OTDR; and
   processing circuitry configured to;
   set the decision threshold of the photodetector to each of a plurality of decision threshold values and, for each decision threshold value:

transmit a first signal into the optical fibre, wherein the first signal is at the second wavelength and comprises a sequence of optical radiation pulses based on a coded sequence, and wherein the sequence of optical radiation pulses are separated by a fill pattern 5 controlled by a binary sequence of high and low values;

obtain a measurement signal comprising bit sequences based on optical radiation detected by the photodetector using the decision threshold value, the optical 10 radiation being backscattered or reflected light from transmission of the first signal into the optical fibre; and compare the measurement signal with the first signal to obtain a correlation signal for the decision threshold 15 value; and combine the plurality of correlation signals to obtain an OTDR trace of the optical fibre.

\* \* \* \* \*